(12) United States Patent
Matsumoto et al.

(10) Patent No.: US 9,223,077 B2
(45) Date of Patent: *Dec. 29, 2015

(54) LIGHT GUIDE PLATE AND LIGHT SOURCE MODULE

(75) Inventors: Shingo Matsumoto, Hsin-Chu (TW);
Han-Wen Tsai, Hsin-Chu (TW);
Chih-Chieh Yu, Hsin-Chu (TW);
Hong-Wei Liang, Hsin-Chu (TW)

(73) Assignee: Coretronic Corporation, Hsin-Chu (TW)

(*) Notice: Subject to any disclaimer, the term of this patent is extended or adjusted under 35 U.S.C. 154(b) by 845 days.

This patent is subject to a terminal disclaimer.

(21) Appl. No.: 13/338,245

(22) Filed: Dec. 28, 2011

(65) Prior Publication Data

US 2012/0188792 A1 Jul. 26, 2012

(30) Foreign Application Priority Data

Jan. 26, 2011 (TW) .............................. 100102932 A

(51) Int. Cl.
*F21V 7/04* (2006.01)
*F21V 8/00* (2006.01)

(52) U.S. Cl.
CPC ............ *G02B 6/0036* (2013.01); *G02B 6/0038* (2013.01); *G02B 6/0061* (2013.01)

(58) Field of Classification Search
CPC  F21V 2200/20; G02B 6/0016; G02B 6/0018; G02B 6/0036; G02B 6/0038; G02B 6/0061
USPC ........................................................ 362/623
See application file for complete search history.

(56) References Cited

U.S. PATENT DOCUMENTS

| | | | | |
|---|---|---|---|---|
| 5,128,842 A | * | 7/1992 | Kenmochi | ...................... 362/95 |
| 5,375,043 A | * | 12/1994 | Tokunaga | ...................... 362/601 |
| 5,980,054 A | * | 11/1999 | Fukui et al. | ................... 362/625 |
| 6,454,452 B1 | * | 9/2002 | Sasagawa et al. | ............. 362/561 |

(Continued)

FOREIGN PATENT DOCUMENTS

| | | |
|---|---|---|
| CN | 1678866 | 10/2005 |
| CN | 1959194 | 5/2007 |

(Continued)

OTHER PUBLICATIONS

"Search Report of European Counterpart Application", issued on Jul. 6, 2012, p. 1-p. 6.

(Continued)

*Primary Examiner* — Mary McManmon
(74) *Attorney, Agent, or Firm* — Jianq Chyun IP Office

(57) ABSTRACT

A light guide plate including a first surface, a second surface, at least one light incident surface, and a plurality of groove sets is provided. The light incident surface connects the first surface and the second surface. The groove sets are separately disposed on the second surface. Each of the groove sets includes a plurality of curved grooves. Each of the curved grooves has a curved inclined reflective surface and a curved back-to-light surface connected thereto. The curved inclined reflective surface is inclined with respect to the first surface. The curved grooves of each of the groove sets curve toward the same curving direction. The curved inclined reflective surface of one of two adjacent curved grooves is connected to the curved back-to-light surface of the other one of the two adjacent curved grooves through a connection surface. A light source module is also provided.

34 Claims, 26 Drawing Sheets

(56) References Cited

U.S. PATENT DOCUMENTS

| | | | |
|---|---|---|---|
| 6,612,722 B2 | 9/2003 | Ryu et al. | |
| 6,659,615 B2 * | 12/2003 | Umemoto | 362/600 |
| 6,729,736 B2 * | 5/2004 | Umemoto | 362/621 |
| 6,834,973 B2 * | 12/2004 | Ohkawa | 362/617 |
| 6,851,815 B2 * | 2/2005 | Lee | 362/23 |
| 6,967,698 B2 * | 11/2005 | Tanoue et al. | 349/62 |
| 7,040,787 B2 * | 5/2006 | Pommeret et al. | 362/496 |
| 7,056,005 B2 * | 6/2006 | Lee | 362/625 |
| 7,507,011 B2 * | 3/2009 | Ueno et al. | 362/625 |
| 7,967,494 B2 * | 6/2011 | Chi et al. | 362/626 |
| 8,491,176 B2 * | 7/2013 | Lin et al. | 362/626 |
| 2001/0053075 A1 * | 12/2001 | Parker et al. | 362/31 |
| 2002/0048364 A1 | 4/2002 | Gligor et al. | |
| 2002/0135996 A1 * | 9/2002 | Suga | 362/31 |
| 2008/0225393 A1 | 9/2008 | Rinko | |
| 2009/0257245 A1 * | 10/2009 | Kim et al. | 362/626 |

FOREIGN PATENT DOCUMENTS

| | | |
|---|---|---|
| CN | 101025493 | 8/2007 |
| CN | 101542357 | 9/2009 |
| CN | 101606020 | 12/2009 |
| EP | 1544537 | 6/2005 |
| JP | 11-250714 | 9/1999 |
| JP | 2006128072 | 5/2006 |
| JP | 2006-351286 | 12/2006 |
| JP | 2007-53021 | 3/2007 |
| JP | 2007-66880 | 3/2007 |
| JP | 2009-193884 | 8/2009 |
| JP | 2009-271376 | 11/2009 |
| JP | 2010-205504 | 9/2010 |
| KR | 10-2008-0025354 | 3/2008 |
| KR | 10-2008-0044150 | 5/2008 |
| KR | 10-2008-0071697 | 8/2008 |
| TW | 200419202 | 10/2004 |
| TW | I222533 | 10/2004 |
| TW | 200530632 | 9/2005 |
| TW | 200604607 | 2/2006 |
| TW | I282021 | 6/2007 |
| TW | M321111 | 10/2007 |
| TW | I296352 | 5/2008 |
| TW | 200825468 | 6/2008 |
| TW | 201135292 | 10/2011 |
| WO | 9819105 | 5/1998 |
| WO | 2008038754 | 4/2008 |
| WO | 2010014578 | 2/2010 |

OTHER PUBLICATIONS

"First Office Action of China Counterpart Application" with English translation thereof, issued on Feb. 28, 2013, p. 1- p. 14.

"Office Action of Japan Counterpart Application" with English translation thereof, issued on Mar. 5, 2013, p. 1-p. 7.

"Office Action of Japan Counterpart Application", issued on Jun. 18, 2013, p. 1-p. 3.

"Office Action of China Counterpart Application", issued on Oct. 25, 2013, p. 1-p. 9.

"Office Action of Taiwan Counterpart Application", issued on Dec. 9, 2013, p. 1-p. 13.

* cited by examiner

LIGHT GUIDE PLATE AND LIGHT SOURCE MODULE

CROSS-REFERENCE TO RELATED APPLICATION

This application claims the priority benefit of Taiwan application serial no. 100102932, filed on Jan. 26, 2011. The entirety of the above-mentioned patent application is hereby incorporated by reference herein and made a part of this specification.

BACKGROUND OF THE INVENTION

1. Field of the Invention

The invention is related to an optical device and a light source, and more particularly to a light guide plate and a light source module.

2. Description of Related Art

Conventional side incident type light source modules use a light guide plate to guide a light beam emitted by a light emitting device disposed at the side of the light guide plate to the front of the light guide plate, to form a surface light source. Generally, when the light beam emitted by the light emitting device enters the light guide plate through the side of the light guide plate, it will continuously be totally reflected by the top surface and the bottom surface of the light guide plate, and is limited in the light guide plate. However, microstructures disposed in the surface of the light guide plate could disrupt the total reflection, causing the light beam to hit the top surface at an angle smaller than the critical angle, and thus passing through the top surface.

Even though the microstructures could disrupt the effect of total reflection, through the utilization of microstructures, most of the light beam will exit the top surface of the light guide plate obliquely, and not exit the top surface perpendicularly. In order to cause the light beam to exit perpendicularly, a prism sheet is disposed on the top surface of the light guide plate of a conventional light source module, so the advancement of the light beam will be guided directly above. In addition, the prism sheet will reflect the light beam with part of the advancement angle back to the light guide plate, such that the light beam could be reused again. However, when the light beam passes through an additional prism sheet and is totally reflected to the light guide plate, light is wasted, thus reducing the brightness provided by the light source module.

Taiwan Patent No. I282021 discloses microstructures of a light guide plate, and the microstructures are arranged repeatedly on a bottom surface of the light guide plate. Taiwan Patent No. I296352 discloses a light guide plate with a plurality of annular structures. The light guide plate has a first annular structure and a second annular structure. The first circular structure and the second circular structure have different widths of bottom surfaces. The microstructure could be located on the bottom surface of the light guide plate. U.S. Pat. No. 6,454,452 discloses a light guide plate where a bottom surface thereof has wedge shaped grooves, wherein included angles between inclines and the bottom surface of the grooves are 43 degrees, 45 degrees, and 47 degrees. Taiwan Patent No. M321111 discloses a light guide plate with a certain regular arrangement of microstructures. U.S. Pat. No. 6,612,722 discloses a light guide plate with microstructures. U.S. Pat. No. 6,834,973 discloses a light guide plate with a bottom surface having micro-reflective structures. Taiwan Patent No. I222533 and U.S. Pat. No. 6,967,698 disclose a liquid crystal display apparatus including a surface light source apparatus. Taiwan Patent Publication No. 200530632 discloses a light guide plate.

SUMMARY OF THE INVENTION

The invention provides a light guide plate that could reduce light loss.

The invention provides a light source module with a better light utilization rate.

Other objects and advantages of the invention could be further illustrated by the technical features broadly embodied and described as follows.

In order to achieve one or a part of or all of the above advantages or other advantages, an embodiment of the invention provides a light guide plate including a first surface, a second surface, at least one light incident surface, and a plurality of groove sets. The second surface is opposite to the first surface. The light incident surface connects the first surface and the second surface. The groove sets are separately disposed on the second surface. Each groove set includes a plurality of curved grooves, each curved groove includes a curved inclined reflective surface and a curved back-to-light surface connected to the curved inclined reflective surface, and the curved inclined reflective surface is inclined with respect to the first surface. The curved grooves of each of the groove sets curve towards the same curving direction, the curved inclined reflective surface of one of two adjacent curved grooves is connected to the curved back-to-light surface of the other one of the two adjacent curved grooves through a connection surface, wherein an absolute value of a slope of any tangent line of any point on the connection surface relative to the first surface is less than 1.7.

An embodiment of the invention provides a light source module including the above light guide plate and at least one light emitting device. The light emitting device is disposed beside the light incident surface and is capable of emitting a light beam, wherein the light beam is capable of entering the light guide plate through the light incident surface and is capable of being transmitted outside the light guide plate through the first surface. The curved inclined reflective surface is capable of reflecting the light beam from the light incident surface to the first surface.

Based on the above, the light guide plate and the light source module of the embodiment of the invention has at least one of the following advantages. In the light guide plate and the light source module according to the embodiment of the invention, the curved inclined reflective surface is disposed on the second surface. The curved inclined reflective surface could reflect the light beam emitted by the light emitting surface to a predetermined direction. Thus, a usage quantity of optical films on the first surface of the light guide plate could be reduced, or the optical film could be omitted, thereby reducing light loss and production cost. In addition, since the absolute value of the slope of the tangent line of any point on the connection surface relative to the first surface is less than 1.7, it is easier to remove a mold from the light guide plate after the light guide plate is formed, further raising a transfer ratio of the groove sets.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the disclosure, and are incorporated

DESCRIPTION OF EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
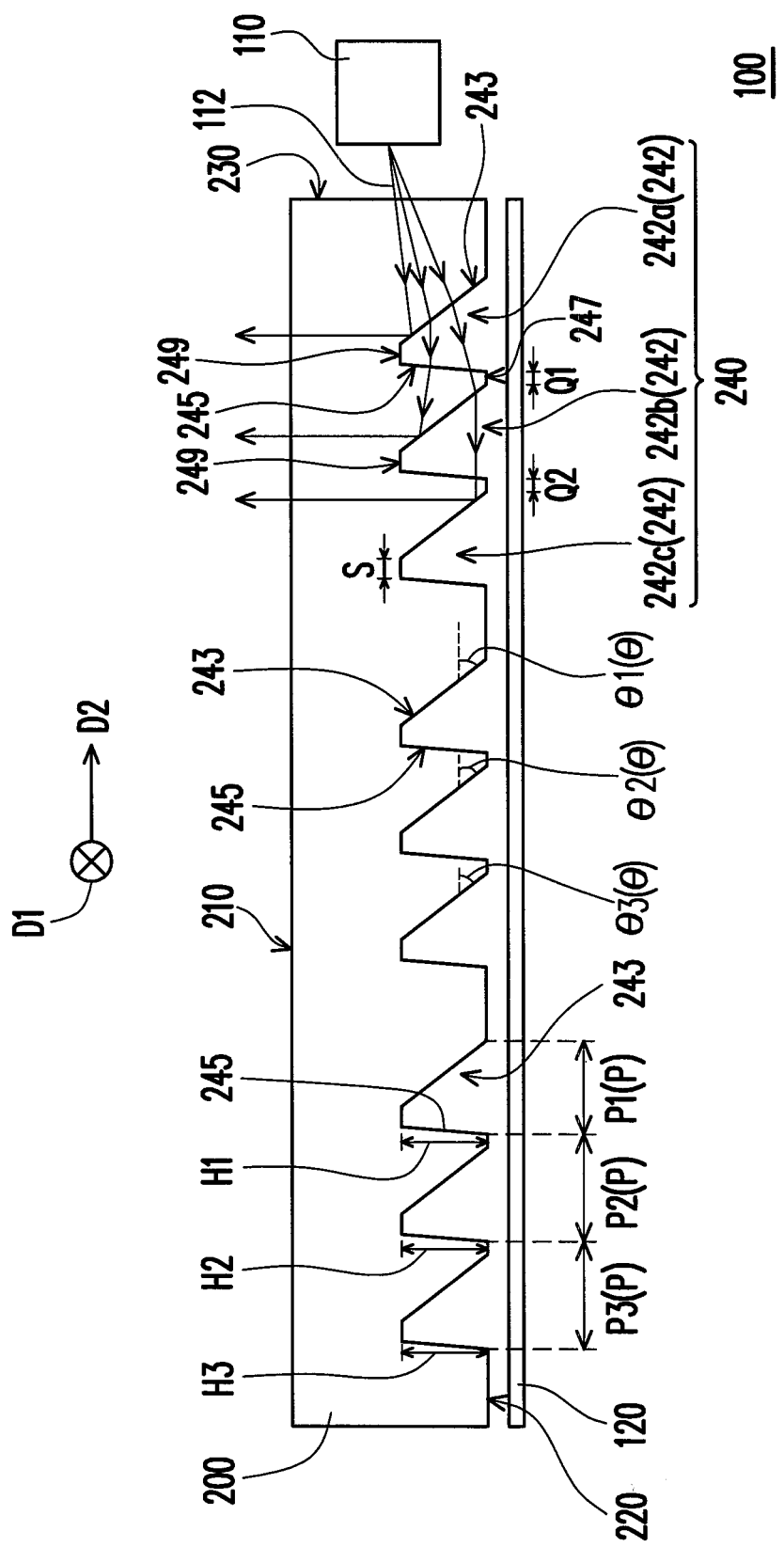
FIG. 1A is a schematic cross-sectional view of a light source module according to an embodiment of the invention.
Figure 1B:
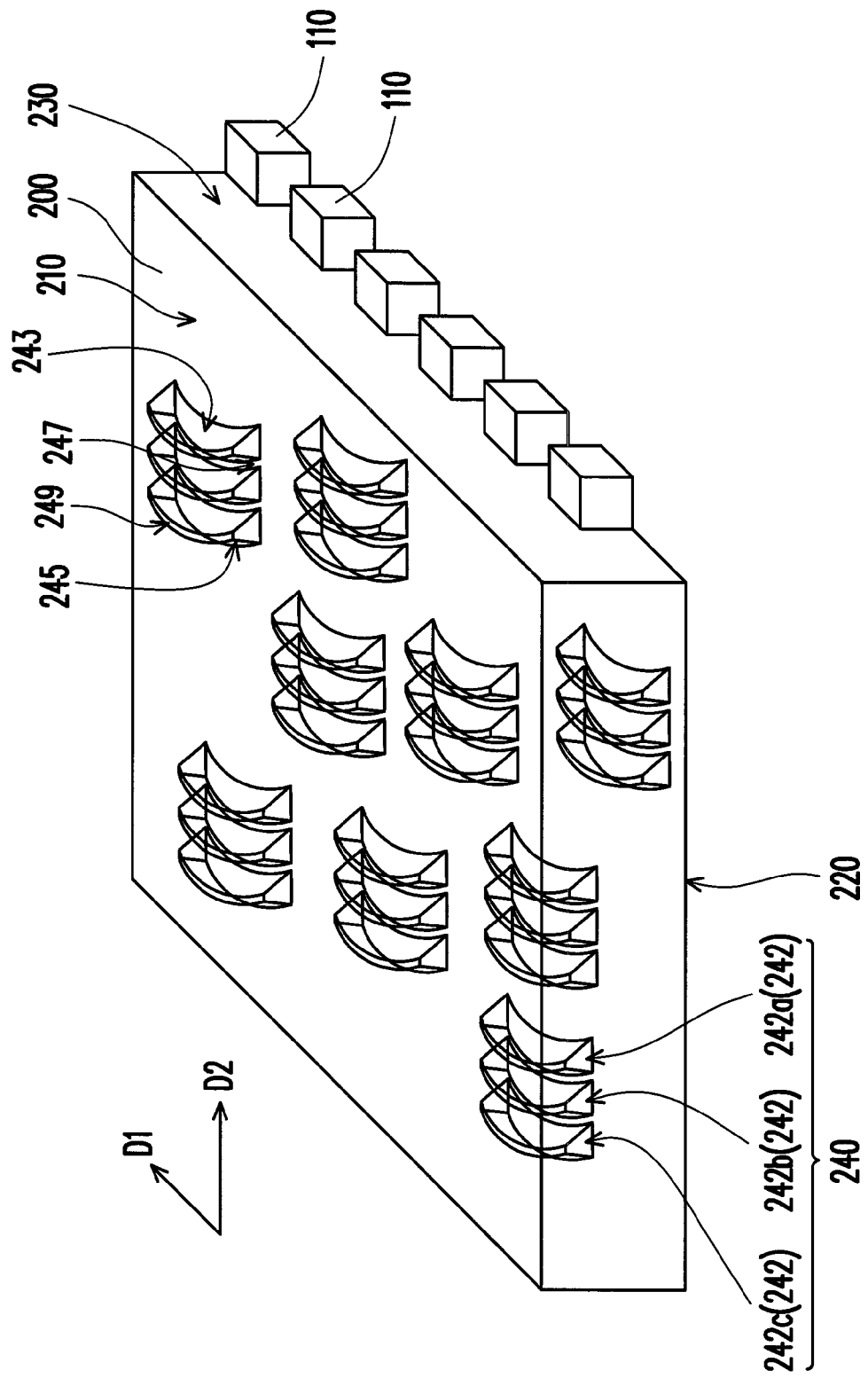
FIG. 1B is a schematic three-dimensional view of a light guide plate and a light source module in FIG. 1A.
Figure 1C:
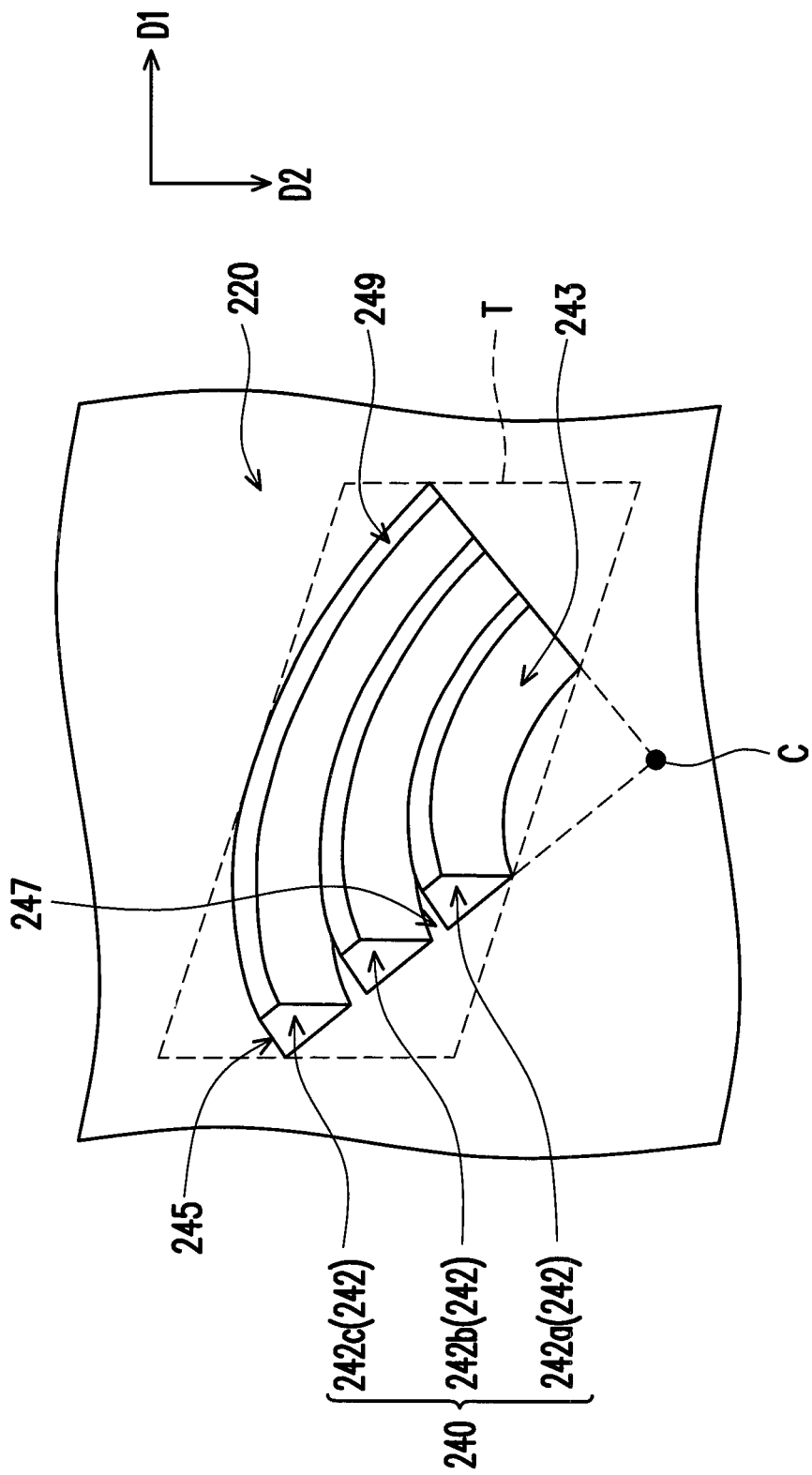
FIG. 1C is an enlarged partial view of a second surface in FIG. 1A.

FIG. 1A is a schematic cross-sectional view of a light source module according to an embodiment of the invention. FIG. 1B is a schematic three-dimensional view of a light guide plate and a light source module in FIG. 1A. FIG. 1C is an enlarged partial view of a second surface in FIG. 1A. Referring to FIG. 1A through FIG. 1C, the light source module 100 of the embodiment includes a light guide plate 200 and at least one light emitting device 110. The plurality of light emitting devices 110 are exemplary in FIG. 1B. The light guide plate 200 includes a first surface 210, a second surface 220, at least one light incident surface 230 (one light incident surface 230 is shown in FIG. 1A and FIG. 1B as an example), and a plurality of groove sets 240. The second surface 220 is opposite to the first surface 210. The light incident surface 230 connects the first surface 210 and the second surface 220. In the embodiment, the first surface 210 is substantially parallel to the second surface 220, and the light incident surface 230 is substantially perpendicular to the first surface 210 and the second surface 220, but the invention is not limited thereto.

The groove sets 240 are separately disposed on the second surface 220. Each groove set 240 includes a plurality of curved grooves 242 (FIG. 1A shows three curved grooves 242a, 242b, and 242c as an example). Each curved groove 242 has a curved inclined reflective surface 243 and a curved back-to-light surface 245 connected to the curved inclined reflective surface 243, and the curved inclined reflective surface 243 is inclined with respect to the first surface 210. In the embodiment, both the curved inclined reflective surface 243 and the curved back-to-light surface 245 are the surfaces of the light guide plate 200. The curved grooves 242 of each of the groove sets 240 curve towards the same curving direction. The curved inclined reflective surface 243 of one of two adjacent curved grooves 242 is connected to the curved back-to-light surface 245 of the other one of the two adjacent curved grooves 242 through a connection surface 247. For example, the curved inclined reflective surface 243 of the curved groove 242b is connected to the curved back-to-light surface 245 of the curved groove 242a through the connection surface 247 between the curved groove 242b and the curved groove 242a. In the embodiment, an absolute value of a slope of any tangent line of any point on the connection surface 247 relative to the first surface 210 is less than 1.7.

The light emitting device 110 is disposed beside the light incident surface 230, and is capable of emitting a light beam 112. In the embodiment, each light emitting device 110 is, for example, a light emitting diode (LED). However, in other embodiments, a fluorescent lamp or other suitable light emitting devices may be used to replace the LEDs. The light beam 112 is capable of entering the light guide plate 200 through the light incident surface 230, and is capable of being transmitted outside the light guide plate 200 through the first surface 210. In addition, the curved inclined reflective surface 243 is capable of reflecting the light beam 112 from the light incident surface 230 to the first surface 210.

In the light guide plate 200 and the light source module 100 of the embodiment, the curved inclined reflective surface 243 on the second surface 220 could reflect the light beam 112 in a predetermined direction. Thus, a usage quantity of optical films (such as using a lens array film) on the first surface 210 of the light guide plate 200 could be reduced, or the optical film could be omitted, thereby reducing light loss and production cost. For example, when the slope of the curved inclined reflective surface 243 is suitably designed, the curved inclined reflective surface 243 could cause the light beam 112 to exit the light guide plate 200 in a direction roughly perpendicular to the first surface 210. Therefore, a prism sheet is not required to dispose over the surface 210 to correct the transmission direction of the light beam 112, thus reducing light loss and production cost. In addition, since the absolute value of the slope of any tangent line of any point on the connection surface 247 relative to the first surface 210 is less than 1.7, it is easier to remove a mold from the light guide plate 200 after the light guide plate 200 is formed, thus raising a transfer ratio of the groove sets 240.

In the embodiment, each of the curved grooves 242 is an arc groove, and the curved inclined reflective surface 243 of the arc groove is located between the curved back-to-light surface 245 and the light incident surface 230. In the embodiment, the curved inclined reflective surface 243 of the curved grooves 242 is located between the curved back-to-light surface 245 of the curved grooves 242 and a curvature center C of the curved grooves 242. In addition, in the embodiment, the curvature centers C of the curved grooves 242a, 242b, and 242c of each groove set 240 substantially coincide with each other, i.e., these curved grooves 242 are concentric arc grooves.

In the embodiment, a first direction D1 is the direction parallel to the light incident surface 230, and a second direction D2 is the direction perpendicular to the light incident surface 230. In the embodiment, the second direction D2 is also parallel to a symmetrical plane of the curved grooves 242 of the groove set 240 passing through the curvature center C, but the invention is not limited thereto.

In addition, in the embodiment, the curved grooves 242, the curved inclined reflective surface 243, and the curved back-to-light surface 245 are curved in a direction substantially parallel to the first surface 210. Thus, the light beam 112 reflected by the curved inclined reflective surface 243 could expand in a direction parallel to the first surface 210, so that the light beam 112 will not be limited to a specific direction. Since the curved inclined reflective surface 243 could expand the light beam 112, thus the light beam 112 exited from the first surface 210 could have a smoother light distribution, and could fulfill the requirements of a wider viewing angle, thereby being adapted to be a backlight source for a liquid crystal display panel, or be a light source of illumination that require a smooth light distribution and wide viewing angle.

A cross-sectional line is obtained by cutting each groove set 240 along a direction perpendicular to the first surface 210 (shown in FIG. 1A). An average slope angle θ of the curved inclined reflective surface 243 is defined as the sum of the slope angles of tangent lines, relative to the first surface, of all points on the cross-section line, divided by the number of points on the cross-section line. This means the average slope angle θ is the average of slope angles θ of tangent lines, relative to the first surface 210, of all points on the cross-sectional line of the curved inclined reflective surface 243 cutting perpendicular to the first surface 210. In the embodiment, the average slope angle θ (for example average slope angle θ1, θ2, and θ3) of each curved inclined reflective surface 243 is greater than or equal to 20 degrees and less than or equal to 70 degrees, so the light beam 112 could advance in a direction close to being perpendicular to the first surface 210. In addition, in the embodiment, the cross-section line of the curved inclined reflective surface 243 formed in a direction perpendicular to the first surface 210 is a straight line. However, in other embodiments, the cross-section line could be a curved line.

In the embodiment, a material of the light guide plate 200 is, for example, plastic (such as acrylic). However, in other embodiments, a material of the light guide plate 200 may be glass, other plastics, or other suitable light-transmissive materials. In addition, the curved back-to-light surface 245 could be substantially perpendicular to the first surface 210, close to being perpendicular to the first surface 210, or slant relative to the first surface 210. An average slope angle of the curved back-to-light surface 245 is defined as the sum of the slope angles of tangent lines, relative to the first surface 210, of all points on the cross-sectional line of the curved back-to-light surface 245 cutting perpendicular to the first surface 210, divided by the number of points on the cross-section lines. This means the average slope angle is the average of the slope angles of tangent lines, relative to the first surface 210, of all points on the cross-sectional line of the curved back-to-light surface 245 cutting perpendicular to the first surface 210. In the embodiment, the average slope angle of each curved back-to-light surface 245 is greater than or equal to 60 degrees and smaller than or equal to 89 degrees.

Widths P (such as widths P1, P2, and P3), along the radial direction from the curvature center C, of the curved grooves 242a, 242b, and 242c of each groove set 240 could be substantially equal, partially equal, or not equal. In addition, depths H1, H2, and H3 of the curved grooves 242a, 242b, and 242c of each groove set 240 could be substantially equal, partially equal, or not equal. In order to easily remove the mold, in the embodiment, a ratio of the width Q (such as the width Q1 or Q2), along the radial direction from the curvature center C, of the connection surface 247 relative to the average value of the widths P of two adjacent curved grooves 242 is greater than or equal to 0.1 and less than or equal to 0.5. For example, the ratio of the width Q1 relative to the sum of the width P1 and the width P2 divided by 2 is greater than or equal to 0.1 and less than or equal to 0.5.

In the embodiment, in order to easily remove the mold, and in order to further increase the transfer ratio of the groove sets 240, each of the curved grooves 242 has a bottom surface 249 connecting the curved inclined reflective surface 243 and the curved back-to-light surface 245, and an absolute value of a slope of any tangent line of any point on the bottom surface 249 relative to the first surface 210 is less than 1.7. In the embodiment, a ratio of a width S, along the radial direction from the curvature center C, of the bottom surface 249 of each curved groove 242 relative to the width P of the same curved groove 242 is greater than or equal to 0.1 and less than or equal to 0.8.

It should be noted that the invention is not limited to having 3 curved grooves 242 in each groove set 240. In other embodiments, each groove set 240 could have 2 curved grooves 242 or have 4 or more curved grooves 242.

In addition, in the embodiment, a length of a diagonal line of an circumscribed rectangle T of each groove set 240 on the second surface 220 is, for example, greater than or equal to 10 micrometers and smaller than or equal to 10000 micrometers. When the light source module 100 is used in a display, the length of the diagonal line of the circumscribed rectangle T of each groove set 240 on the second surface 220 is, for example, greater than or equal to 10 micrometers and smaller than or equal to 10000 micrometers. When the light source module 100 is used in a illumination apparatus, the length of the diagonal line of the circumscribed rectangle T of each groove set 240 on the second surface 220 is, for example, greater than or equal to 50 micrometers and smaller than or equal to 10000 micrometers. Furthermore, the density distribution of the groove sets 240 on the second surface 220 could be designed so that the light beam 112 exiting from the first surface 210 is uniformly distributed. For example, the number density of the groove sets 240 could be progressively increased from an area close to the incident light surface 230 to an area far from the incident light surface 230.

In the embodiment, the light source module 100 further includes a reflecting unit 120 disposed on the second surface 220. The reflecting unit 120 is, for example, a reflecting piece capable of reflecting the light beam 112. However, in other embodiments, the light source module 100 could also not include the reflecting unit 120.

Figure 2A:
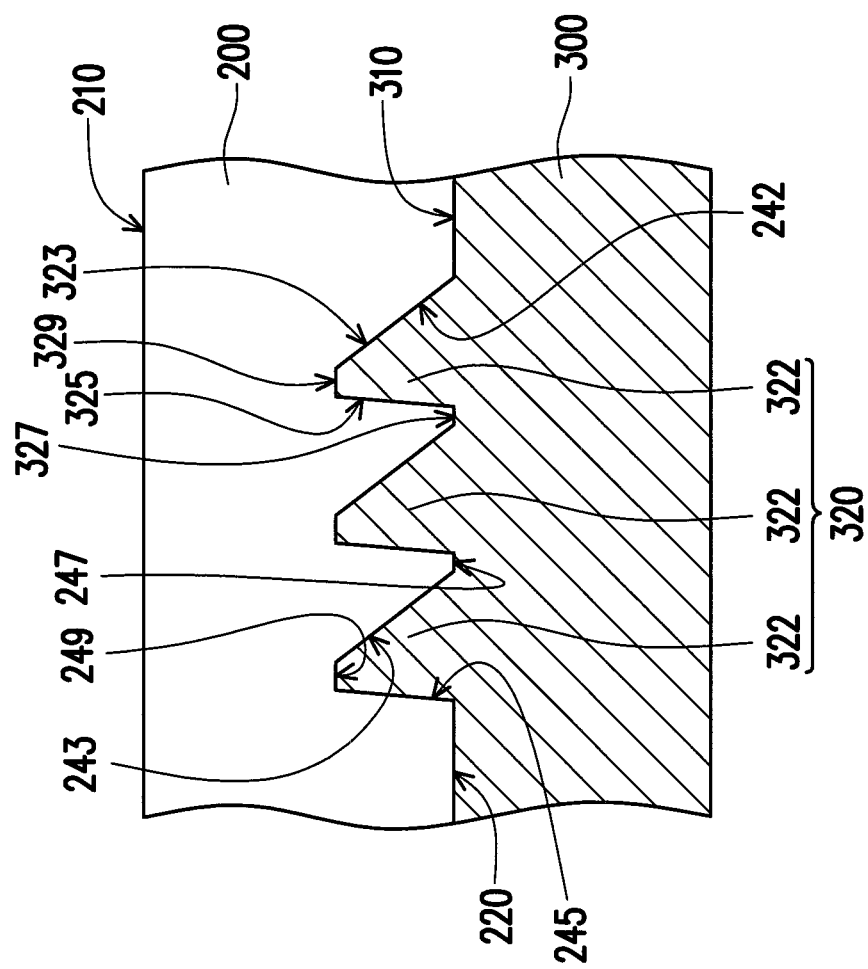
FIG. 2A is a schematic cross-sectional view of a light guide plate in FIG. 1A while undergoing fabrication combined with a mold.
Figure 2B:
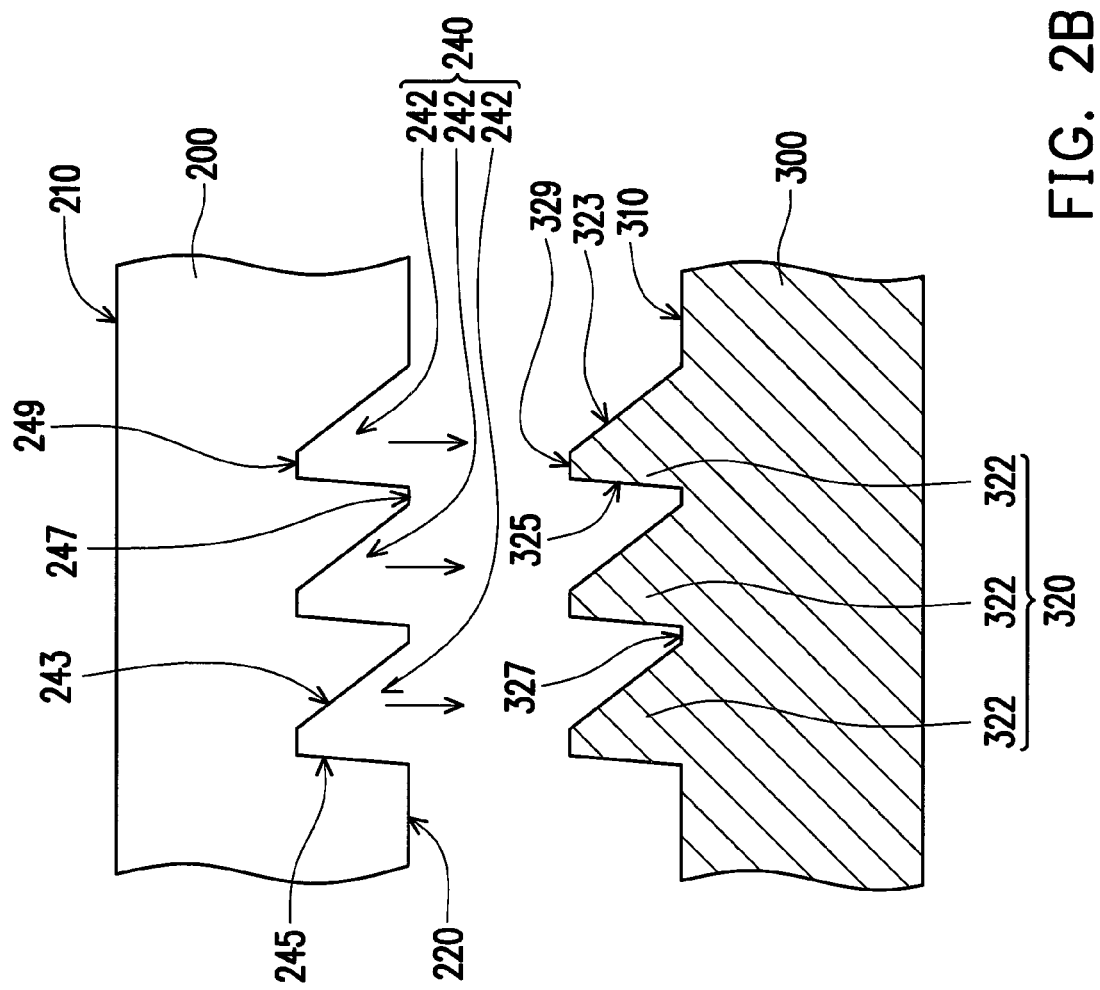
FIG. 2B is a schematic cross-sectional view of a light guide plate in FIG. 2A separated from a mold.
Figure 3:
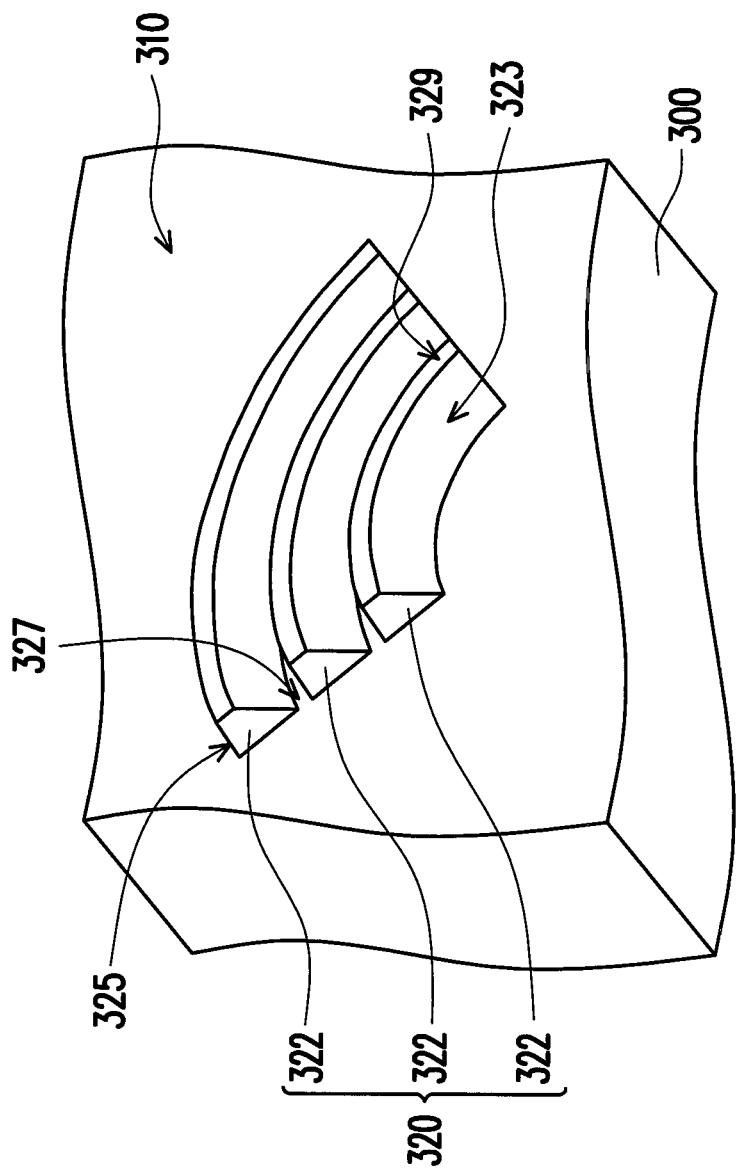
FIG. 3 is a schematic three-dimensional view of a mold.

FIG. 2A is a schematic cross-sectional view of a light guide plate in FIG. 1A while undergoing fabrication combined with a mold. FIG. 2B is a schematic cross-sectional view of a light guide plate in FIG. 2A separated from a mold. FIG. 3 is a schematic three-dimensional view of a mold. Referring to FIG. 1A, FIG. 2A, FIG. 2B, and FIG. 3, the groove sets 240 of the light guide plate 200 of the embodiment could be formed by using a mold 300. The mold 300 includes a contact surface 310 and at least one bump set 320 disposed on the contact surface 310. When the groove sets 240 of the light guide plate 200 have formed, the second surface 220 leans on the contact surface 310. When the light guide plate 200 is removed from the mold 300, the bump set 320 is removed from the light guide plate 200 and forms the groove set 240 of the light guide plate 200. In other words, the shape of the bump set 320 and the shape of the groove set 240 complement each other. When the light guide plate 200 is formed, the bump set 320 and the groove set 240 are embedded in each other, and when the light guide plate 200 is removed from the mold 300, the area where the bump set 320 is removed from the light guide plate 200 forms the groove set 240.

The bump set 320 includes a plurality of curved bumps 322, each curved bump 322 has a first curved surface 323 and a second curved surface 325 connected to the first curved surface 323, and each first curved surface 323 is inclined with respect to the contact surface 310. The curved bumps 322 of the bump set 320 curve towards the same curving direction. The first curved surface 323 of one of two adjacent curved bumps 322 is connected to the second curved surface 325 of the other one of the two adjacent curved bumps 322 through a connection surface 327, wherein an absolute value of a slope of any tangent line of any point on the connection surface 327 relative to the contact surface 310 is less than 1.7. In the embodiment, the connection surface 327 is a plane surface, and the connection surface 327 is substantially parallel to the contact surface 310, but the invention is not limited thereto.

In addition, in the embodiment, each curved bump 322 has a top surface 329 connecting the first curved surface 323 and the second curved surface 325, wherein an absolute value of a slope of any tangent line of any point on the top surface 329 relative to the contact surface 310 is less than 1.7. In the embodiment, the top surface 329 is, for example, a plane surface, and the top surface 329 is substantially parallel to the contact surface 310, but the invention is not limited thereto.

In the embodiment, the method of forming the groove set 240 from the mold 300 could be forming the light guide plate 200 through the mold 300 by mold injection, forming the groove set 240 through the mold 300 by imprinting, forming the groove set 240 through the mold 300 by extrusion, or using a mass production method to form the groove set 240 through the mold 300. The imprinting method includes ultra-violet (UV) imprinting or hot embossing. These forming methods could produce the groove set 240 with a shape complementary to the shape of the bump set 320. The groove set 240 as shown in FIG. 2B is illustrated with a transfer ratio of 100%, as an example. However, depending on the manufacture or manufacture parameters, most of the time, the transfer ratio of the groove set 240 could not achieve 100%.

Figure 4:
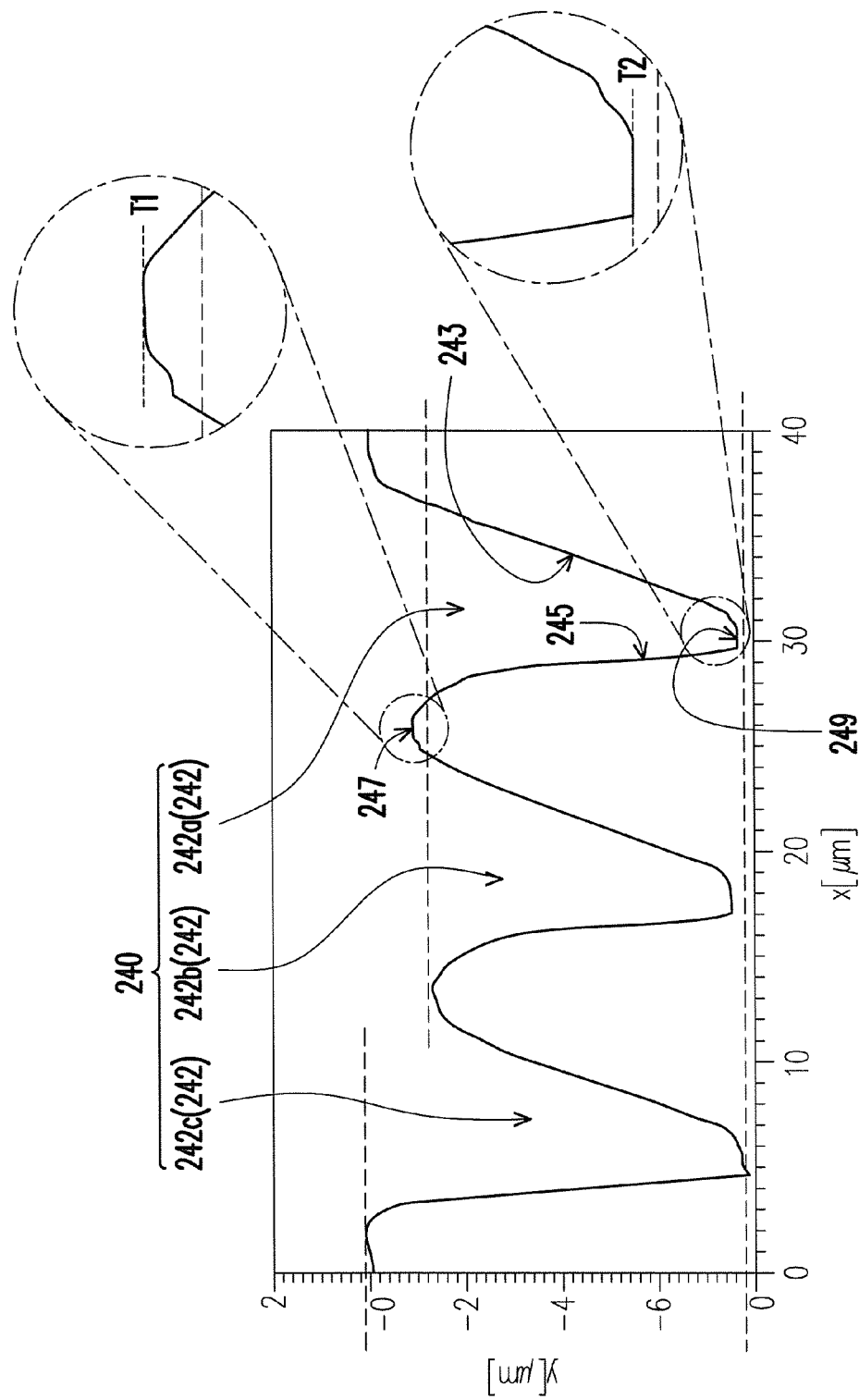
FIG. 4 is a schematic cross-sectional view of a groove set in FIG. 2B with a transfer ratio of 0.8.

FIG. 4 is a schematic cross-sectional view of a groove set in FIG. 2B with a transfer ratio of 0.8, wherein x direction is a direction of the curved groove 242 parallel to the second surface 220, and y direction is a direction perpendicular to the second surface 220. FIG. 4 also shows the connection surface 247 partially enlarged with a tangent line T1 on a random point of the connection surface 247. In addition, the bottom surface 249 is also partially enlarged to show a tangent line T2 on a random point of the bottom surface 249. It can be seen that the tangent line T1 and the tangent line T2 both have slopes that are less than 1.7 with respect to the first surface 210. Y equals 0 designates the height of the second surface 220. The greater the absolute value of the negative value of y means the deeper the groove in the second surface 220. Since the groove set 240 of the embodiment is formed by using the bump set 320 of the mold 300, and the mold 300 has the connection surface 327 and the top surface 329, thus the transfer ratio of the groove set 240 is greater than or equal to 0.8, further increasing the optical quality of the groove set 240.

Figure 5A:
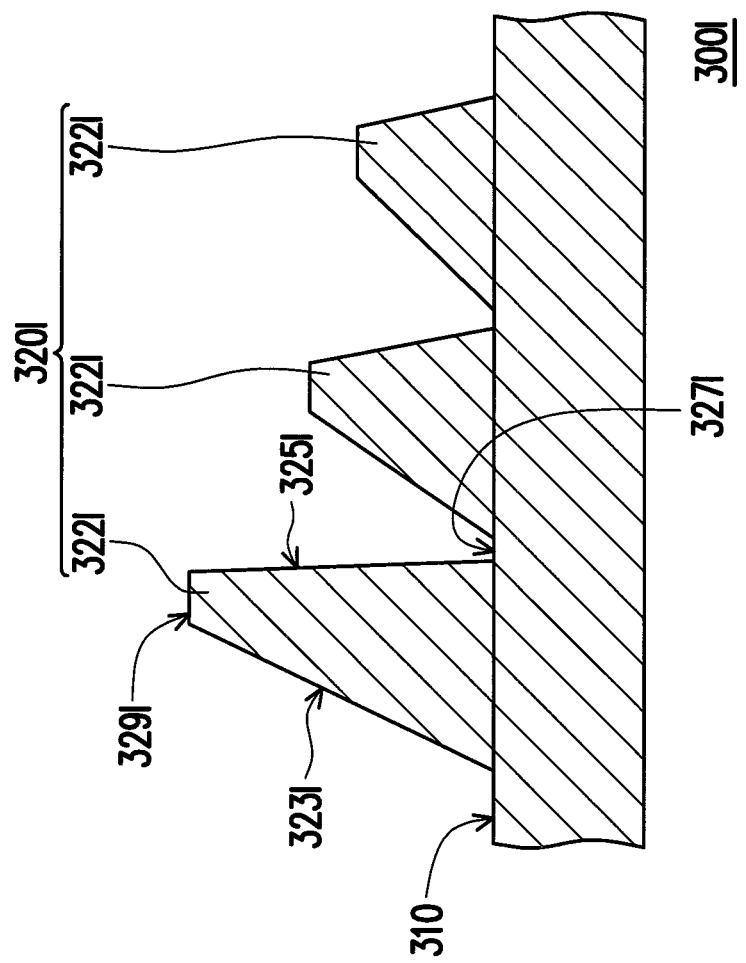
FIG. 5A illustrates a schematic cross-sectional view of a mold according to another embodiment of the invention.
Figure 5B:
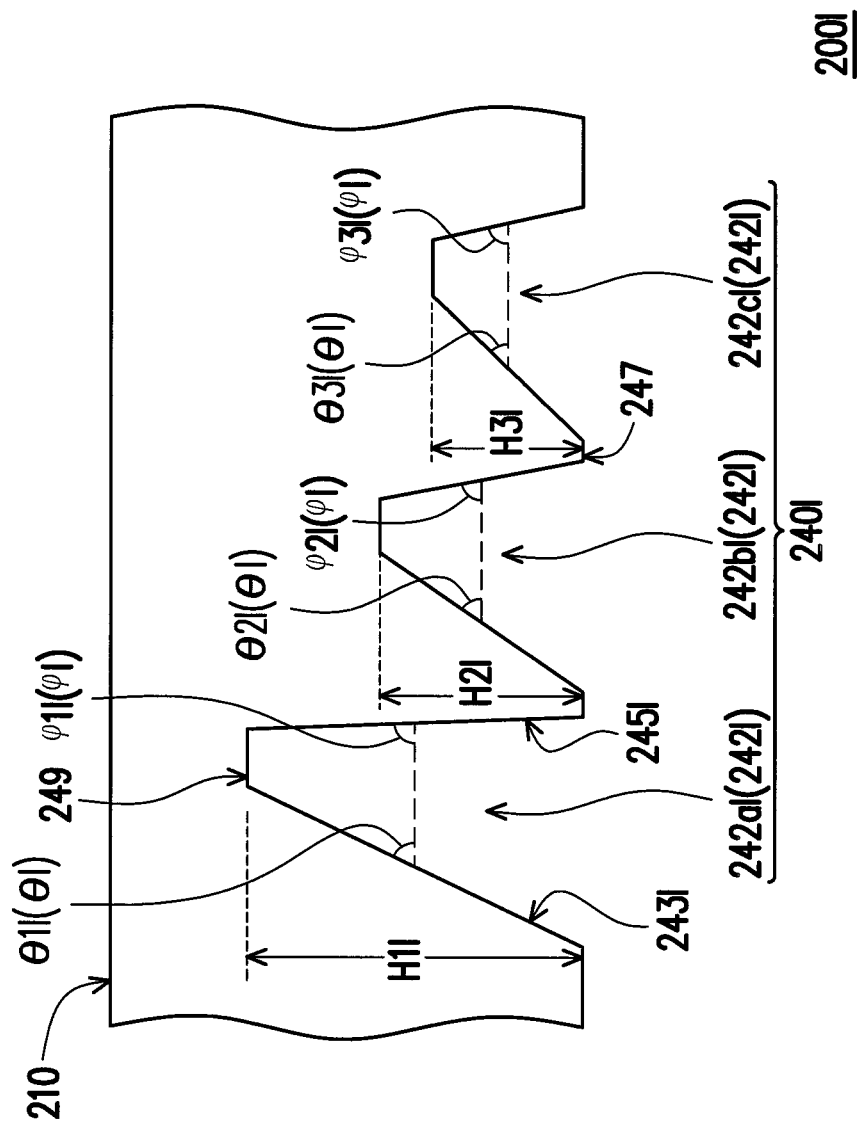
FIG. 5B is a partial cross-sectional view of a light guide plate formed with a mold in FIG. 5A with a transfer ratio of 100%.

FIG. 5A illustrates a schematic cross-sectional view of a mold according to another embodiment of the invention. FIG. 5B is a partial cross-sectional view of a light guide plate formed with a mold in FIG. 5A with a transfer ratio of 100%. Referring to FIG. 5A and FIG. 5B, a mold 3001 and a light guide plate 200l of the embodiment are similar to the mold 300 and the light guide plate 200 in FIG. 2B. The difference therebetween is described as follows.

In the light guide plate 200l of the embodiment, average slope angles θ1 of the curved inclined reflective surfaces 2431 of the curved grooves 2421 of each groove set 2401 relative to the first surface 210 is substantially different. For example, the average slope angles θ11, θ21, and θ31 of the curved inclined reflective surfaces 2431 of the curved grooves 242a1, 242b1, and 242c1 are not equal to each other. However, in other embodiments, the average slope angles θ1 of the curved inclined reflective surfaces 2431 of the curved grooves 2421 of each groove set 2401 relative to the first surface 210 could be substantially the same, but the invention is not limited thereto.

Since the average slope angles θ11, θ21, and θ31 are not equal to each other, an advancement direction of the light beam 112 (refer to FIG. 1A) reflected by the curved inclined reflective surface 2431 of the curved grooves 242a1, 242b1, and 242c1 will expand on a plane perpendicular to the first surface 210, allowing the light beam 112 to have smoother light distribution, fulfilling the requirements of a wider viewing angle.

In the embodiment, the difference value between a greatest value and a smallest value of the average slope angles θ1 of the curved inclined reflective surfaces 2431 of the curved grooves 2421 of each groove set 2401 relative to the first surface 210 is smaller than or equal to 25 degrees. For example, the values of the average slope angle θ11, the average slope angle θ21, and the average slope angle θ31, are 59.62 degrees, 49.57 degrees, and 40.23 degrees, respectively. The greatest value between the average slope angle θ11, the average slope angle θ21, and the average slope angle θ31 is 59.62 degrees, and the smallest value is 40.23 degrees, and the difference value between the two is 19.39, which is less than 25 degrees.

In the embodiment, the average slope angles φ1 of the curved back-to-light surfaces 2451 of the curved grooves 2421 of each groove set 2401 relative to the first surface 210 could be substantially different (FIG. 1A shows, as an example, as substantially the same). The difference value between a greatest value and a smallest value of the average slope angles φ1 of the curved back-to-light surfaces 2451 of the curved grooves 2421 of each groove set 2401 relative to the first surface 210 is smaller than or equal to 25 degrees. For example, the value of the average slope angle φ11 is, for example, 86.93 degrees (the greatest value), the average slope angle φ21 is, for example, 77.01 degrees, and the average slope angle φ31 is 74.97 degrees (the smallest value). The difference value between the average slope angle φ11 and the average slope angle φ31 is 11.96 degrees, which is smaller than 25 degrees. In addition, in the embodiment, the depths H1, H2, and H3 of the curved grooves 2421 of each groove set 2401 could also be different.

The shapes of the bump set 3201 of the mold 3001 used to form the groove set 2401 are complementary to the shape of the groove set 2401, thus regarding the parameters of the first curved surface 3231, the second curved surface 3251, the connection surface 3271, and the top surface 3291 of each curved bump 322 of the bump set 3201, please refer to the parameters of the curved inclined reflective surface 2431, the curved back-to-light surface 2451, the connection surface 247, and the bottom surface 249 of the curved groove 2421, and will not be repeated herein.

The groove set 2401 of FIG. 5B has, for example, a transfer ratio of 100%. When the transfer ratio is smaller than 100% and larger than or equal to 80%, the shape of the groove set 2401 will be slightly different than the shape in FIG. 5B.

Figure 6A:
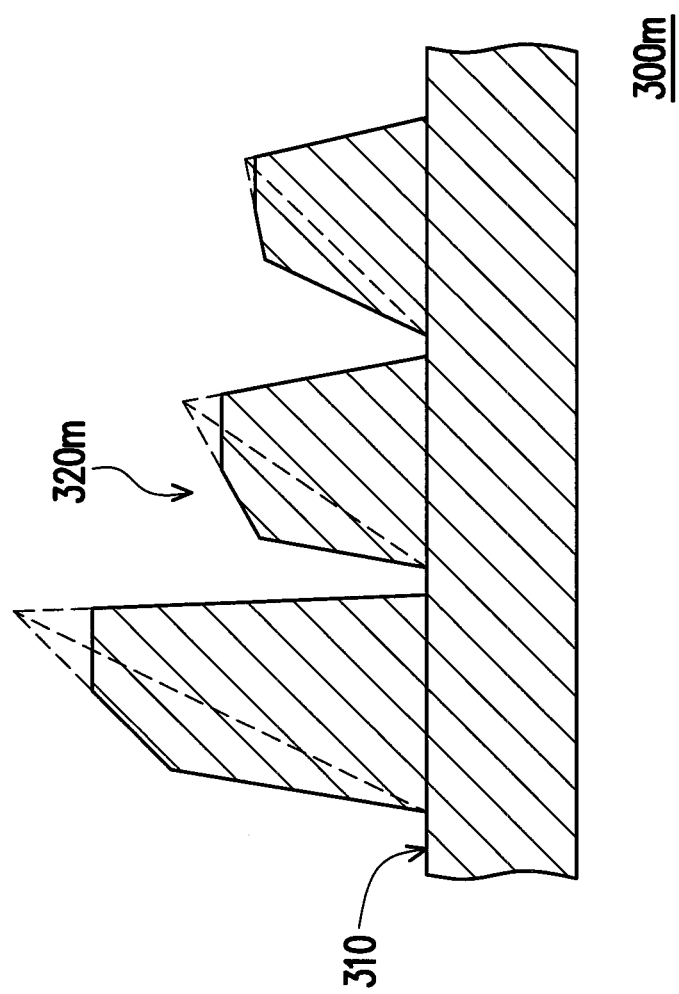
FIG. 6A illustrates a schematic cross-sectional view of a mold according to another embodiment of the invention.
Figure 6B:
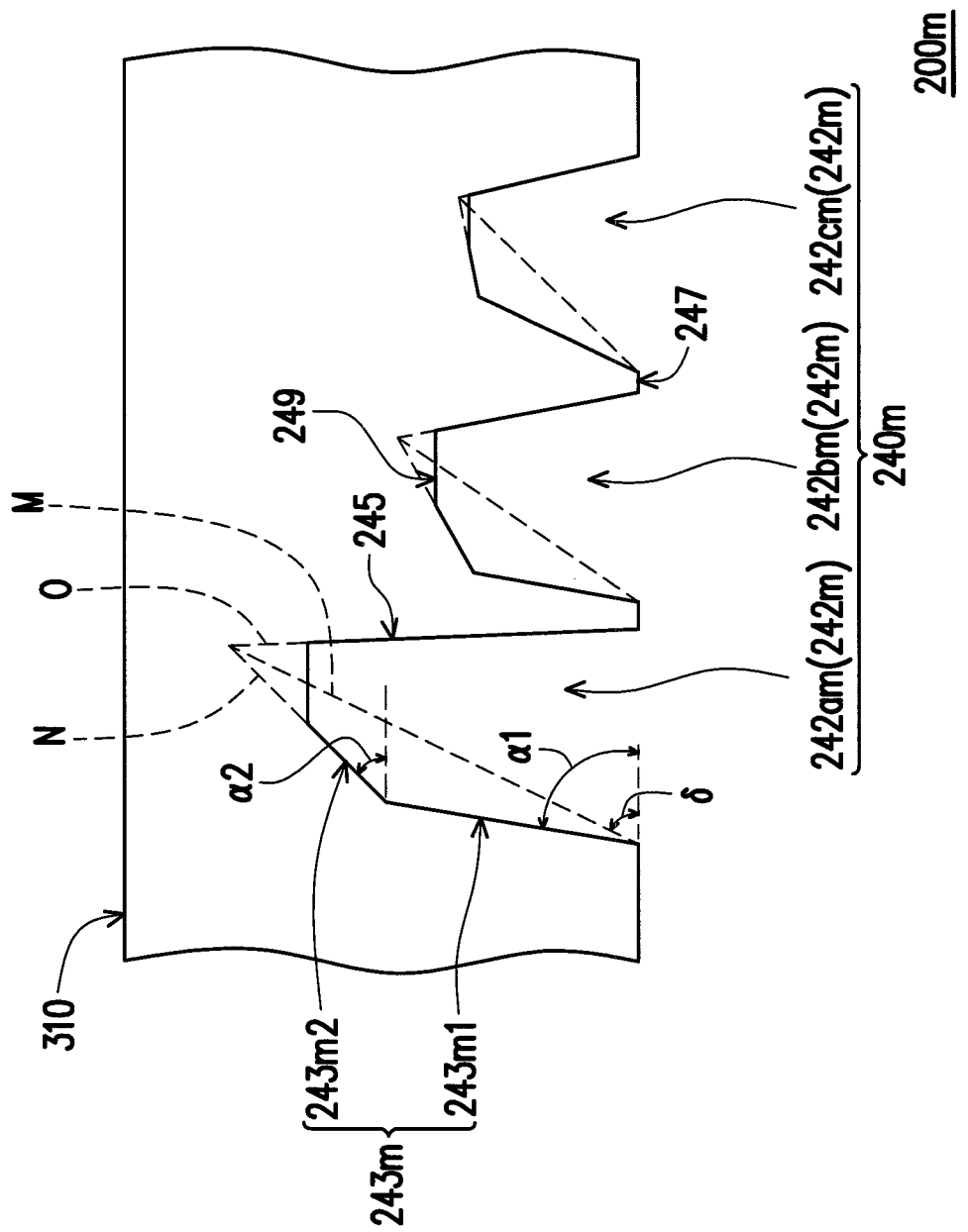
FIG. 6B is a partial cross-sectional view of a light guide plate formed with a mold in FIG. 6A with a transfer ratio of 100%.

FIG. 6A illustrates a schematic cross-sectional view of a mold according to another embodiment of the invention. FIG. 6B is a partial cross-sectional view of a light guide plate formed with a mold in FIG. 6A with a transfer ratio of 100%. Referring to FIG. 6A and FIG. 6B, a mold 300m and a light guide plate 200m of the embodiment are similar to the mold 3001 and the light guide plate 200l of FIG. 5A and FIG. 5B. The difference therebetween is described as follows. In the light guide plate 200m of the embodiment, a curved inclined reflective surface 243m of each curved groove 242m of a groove set 240m include a plurality of sub-curved inclined reflective surfaces with discrete slopes (FIG. 6B shows two sub-curved inclined reflective surfaces 243m1 and 243m2 as an example). The curved inclined reflective surface 243m of each of the curved grooves 242m has a reference angle δ. A difference between a slope angle α1, α2 of each of the sub-curved inclined reflective surfaces 243m1 and 243m2 of each of the curved inclined reflective surfaces 243m relative to the first surface 210 and the corresponding reference angle δ (i.e. the reference angle of the same curved groove 242m) is less than or equal to 10 degrees, and the reference angle δ of each of the curved inclined reflective surfaces 243m is greater than or equal to 20 degrees and less than or equal to 70 degrees. In the embodiment, the difference between the greatest value and the smallest value of the reference angles δ of the curved grooves 242am, 242bm, and 242cm is less than or equal to 25 degrees. The difference between the greatest value and the smallest value of the slope angles α1 of the curved grooves 242am, 242bm, and 242cm is smaller than or equal to 25 degrees, and the difference between the greatest value and the smallest value of the slope angles α2 of the curved grooves 242am, 242bm, and 242cm is smaller than or equal to 25 degrees. In addition, in the embodiment, a reference line M that forms the reference angle δ, an extending line N of the sub-curved inclined reflective surface 243m2 closest to the bottom of the curved groove 242m, and an extending line O of the curved back-to-light surface 245 all meet at a same point. In another embodiment, the curved groove 242m could also not include the bottom surface 249, and the curved inclined reflective surface 243m is directly connected to the curved back-to-light surface 245.

The shapes of the bump set 320m of the mold 300m and the shape of the groove set 240m are complementary. Regarding the parameters of the bump set 320m, please refer to the parameters of the groove set 240m, and will not be repeated herein. In addition, when the transfer ratio of the groove set 240m is smaller than 100% and larger than or equal to 80%, the shape of the groove set 240m will be slightly different than the shape in FIG. 6B.

Figure 7A:
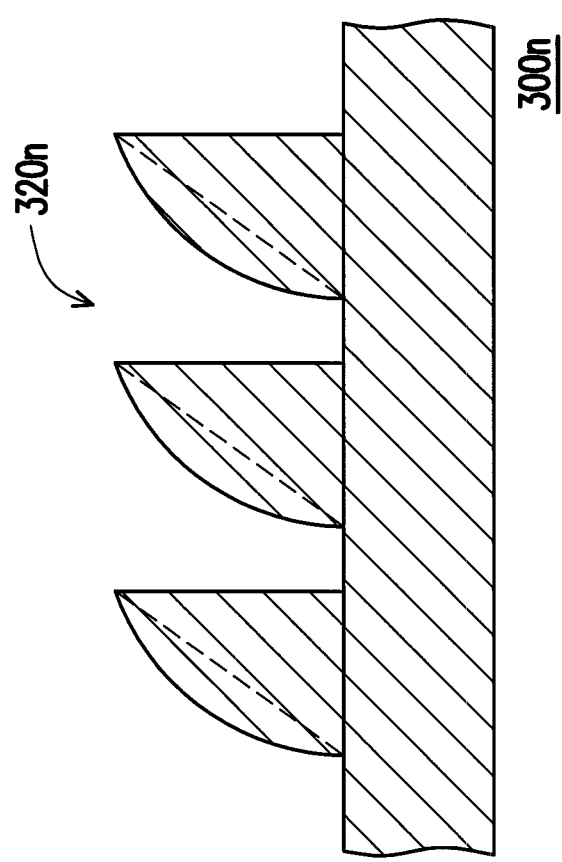
FIG. 7A illustrates a schematic cross-sectional view of a mold according to yet another embodiment of the invention.
Figure 7B:
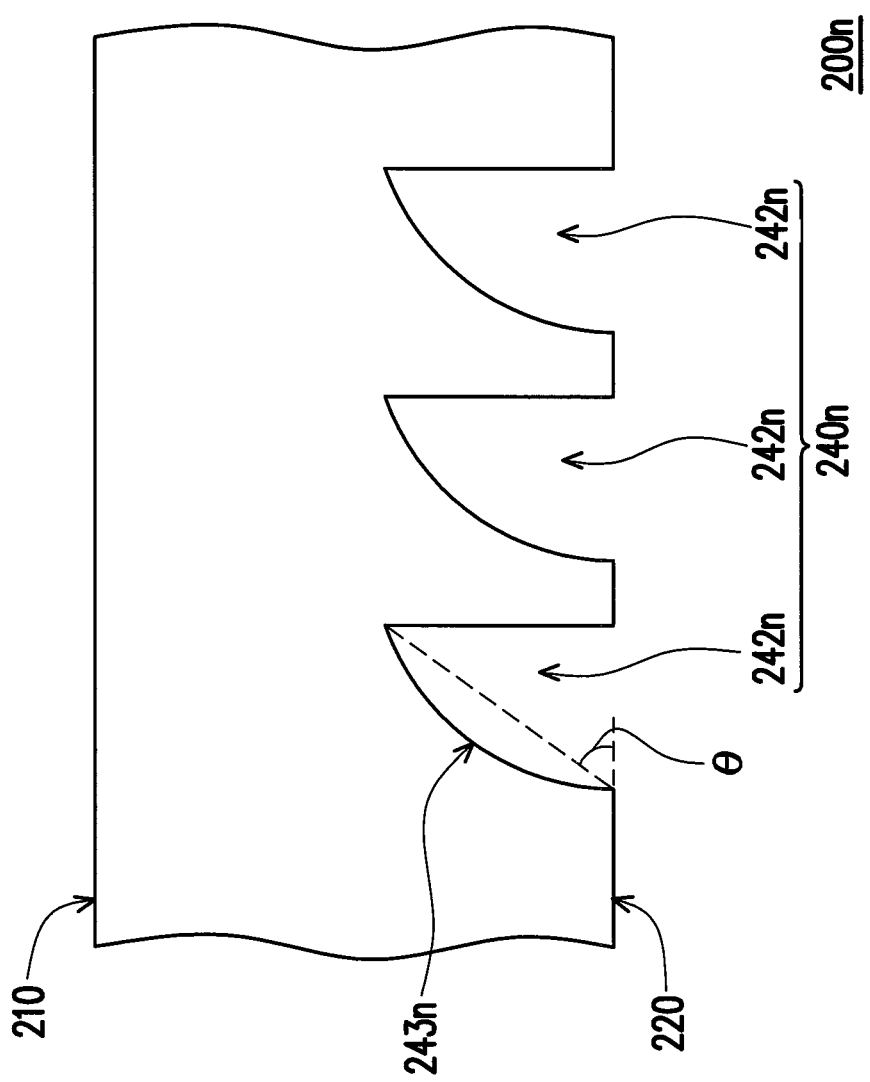
FIG. 7B is a partial cross-sectional view of a light guide plate formed with a mold in FIG. 7A with a transfer ratio of 100%.

FIG. 7A illustrates a schematic cross-sectional view of a mold according to yet another embodiment of the invention. FIG. 7B is a partial cross-sectional view of a light guide plate formed with a mold in FIG. 7A with a transfer ratio of 100%. Referring to FIG. 7A and FIG. 7B, a mold 300n and a light guide plate 200n of the embodiment are respectively similar to the mold 300 and the light guide plate 200 of FIG. 2B. The difference therebetween is described as follows. In the embodiment, the cross-section line of the curved inclined reflective surface 243n of each curved groove 242n of the groove set 240n obtained by cutting along a direction perpendicular to the first surface 210 could be curved (shown in FIG. 7B). Thus, the light beam 112 could expand on a plane perpendicular to the first surface 210, so that the light beam 112 will not be limited to a specific direction. In the embodiment, the slopes of tangent lines of each of the curved inclined reflective surfaces 243n relative to the first surface 210 progressively increase from an end close to the first surface 210 to an end close to the second surface 220. In other words, the curved inclined reflective surface 243n is a bump surface in a direction perpendicular to the first surface 210.

The shape of the bump set 320n of the mold 300n complements the shape of the groove set 240n. When the transfer ratio of the groove set 240n is smaller than 100% and larger than or equal to 80%, the shape of the groove set 240n will be slightly different than the shape in FIG. 7B.

Figure 8A:
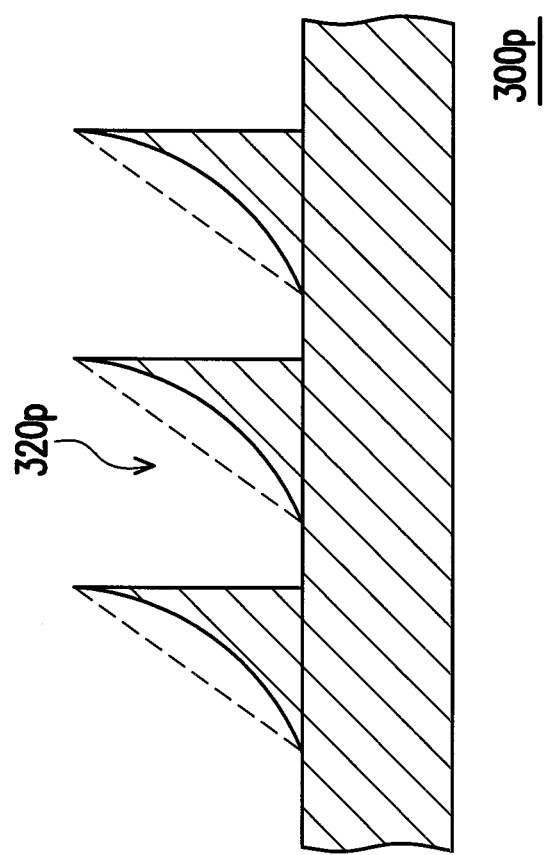
FIG. 8A illustrates a schematic cross-sectional view of a mold according to still another embodiment of the invention.
Figure 8B:
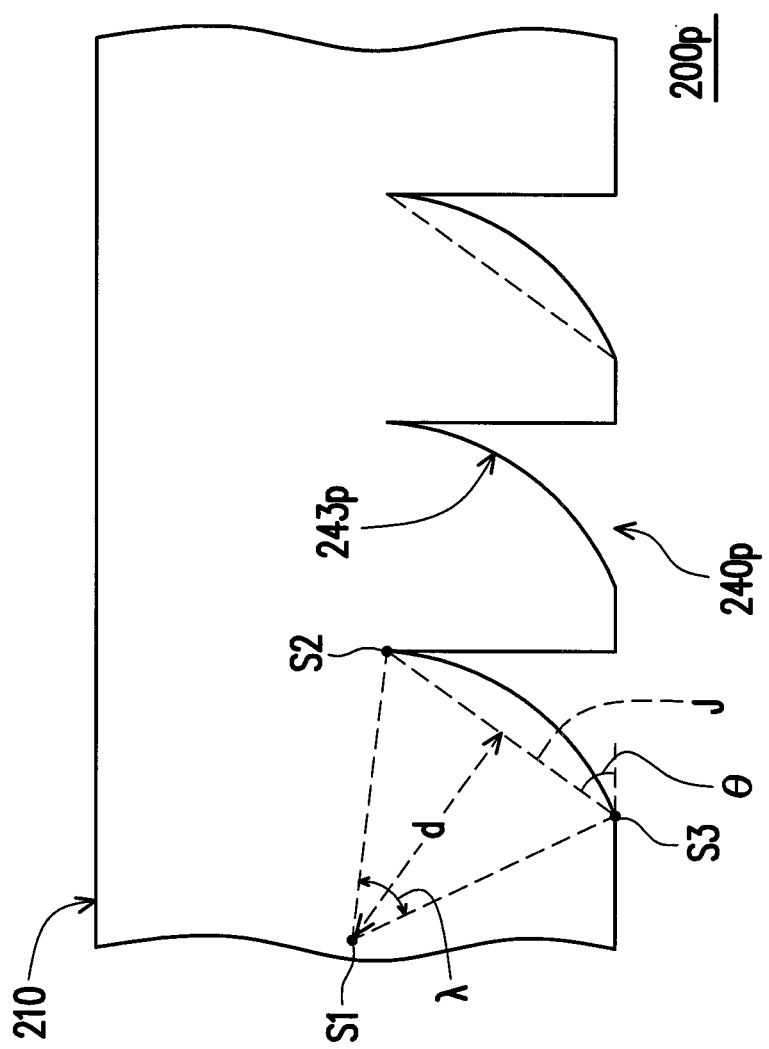
FIG. 8B is a partial cross-sectional view of a light guide plate formed with a mold in FIG. 8A with a transfer ratio of 100%.
Figure 8C:
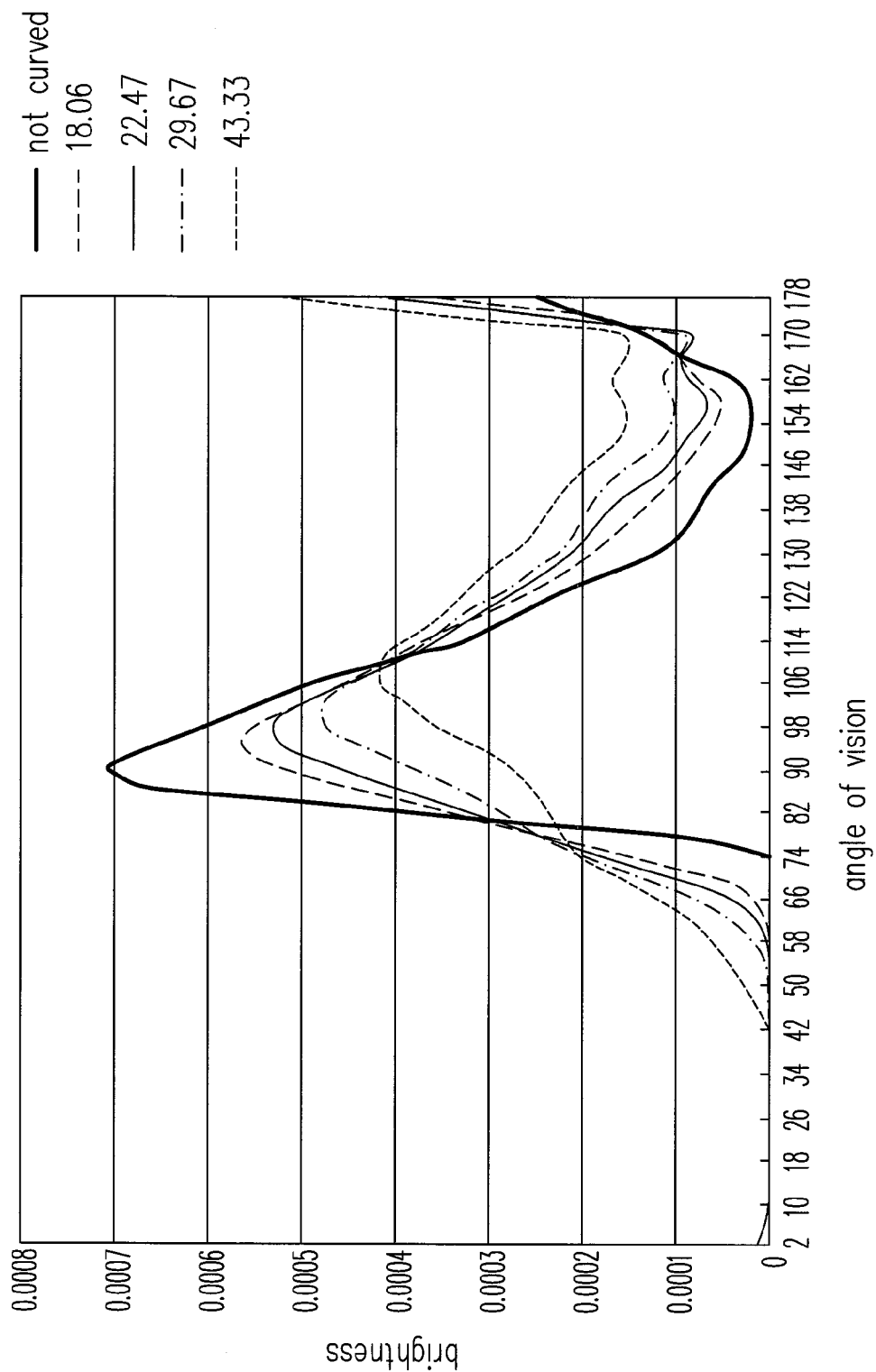
FIG. 8C is a distribution diagram of a brightness of a light source module of a light guide plate of FIG. 8B relative to an angle of vision.

FIG. 8A illustrates a schematic cross-sectional view of a mold according to still another embodiment of the invention. FIG. 8B is a partial cross-sectional view of a light guide plate formed with a mold in FIG. 8A with a transfer ratio of 100%. FIG. 8C is a distribution diagram of a brightness of a light source module of a light guide plate of FIG. 8B relative to an angle of vision. Referring to FIG. 8A and FIG. 8B, a mold 300p and a light guide plate 200p of the embodiment are respectively similar to the mold 300n and the light guide plate 200n of FIG. 7A and FIG. 7B. The difference therebetween is described as follows. In the embodiment, the slopes of tangent lines of each of the curved inclined reflective surfaces 243p of the groove set 240p relative to the first surface 210 progressively decrease from an end close to the first surface 210 to an end close to the second surface 220. In other words, the curved inclined reflective surface 243p is a recessed surface in a direction perpendicular to the first surface 210. The curved inclined reflective surfaces 243n, 243p with the curved cross-section lines of FIG. 7B and FIG. 8B could be used to replace the sub-curved inclined reflective surfaces 243m1, 243m2 with the straight cross-section lines of FIG. 6B, which means the cross-section lines of the sub-curved inclined reflective surfaces 243m1, 243m2 are changed to curved shapes.

In the embodiment, the shape of the bump set 320p of the mold 300p complements the shape of the groove set 240p. When the transfer ratio of the groove set 240p is smaller than 100% and larger than or equal to 80%, the shape of the groove set 240p will be slightly different than the shape in FIG. 8B.

The values beside the different lines of FIG. 8C represent the expanded angles λ of the cross-section lines (i.e. the arc between the point S2 and the point S3 of FIG. 8B) of the adopted curved inclined reflective surface 243p relative to the curvature center S1 of the cross-section line. The corresponding unit is in degrees, and the "not curved" beside the solid bold line represents a straight cross-section line. Known from FIG. 8C, when the expanded angle δ of the cross-section line is bigger, the light distribution range is wider. In addition, in the embodiment, when the expanded angle δ is bigger and a peak value is lower, the location of the peak shifts. Table 1 below shows the relationship of the expanded angle δ and a distance d between the curvature center S1 and a chord J (the straight line segment connecting the point S2 and the point S3) of the cross-section line (i.e. the arc between the point S2 and the point S3) in an embodiment, but the invention is not limited thereto.

TABLE 1

| d(μm) | ∞ | 50 | 40 | 30 | 20 |
|---|---|---|---|---|---|
| (degrees) | 0 | 18.06 | 22.47 | 29.67 | 43.33 |

In table 1, when the distance d=50 micrometers, the angle λ=18.06 degrees, and the other corresponding relations could be deduced, so will not be repeated herein.

Figure 9:
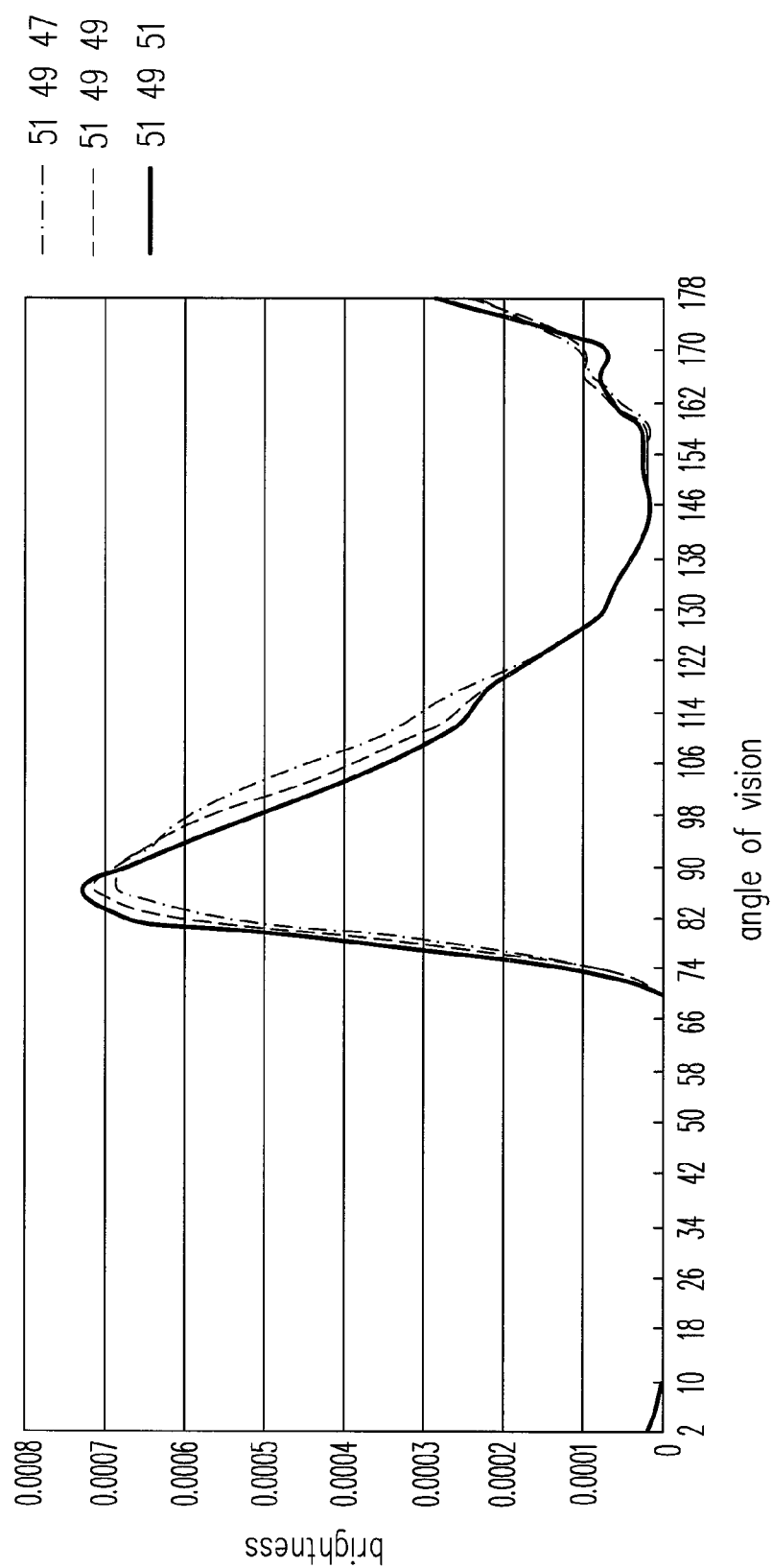
FIG. 9 is a distribution diagram of a brightness generated by a light guide plate of FIG. 5B with different average slope angles $\theta 11$, $\theta 21$, and $\theta 31$ relative to an angle of vision.
Figure 10:
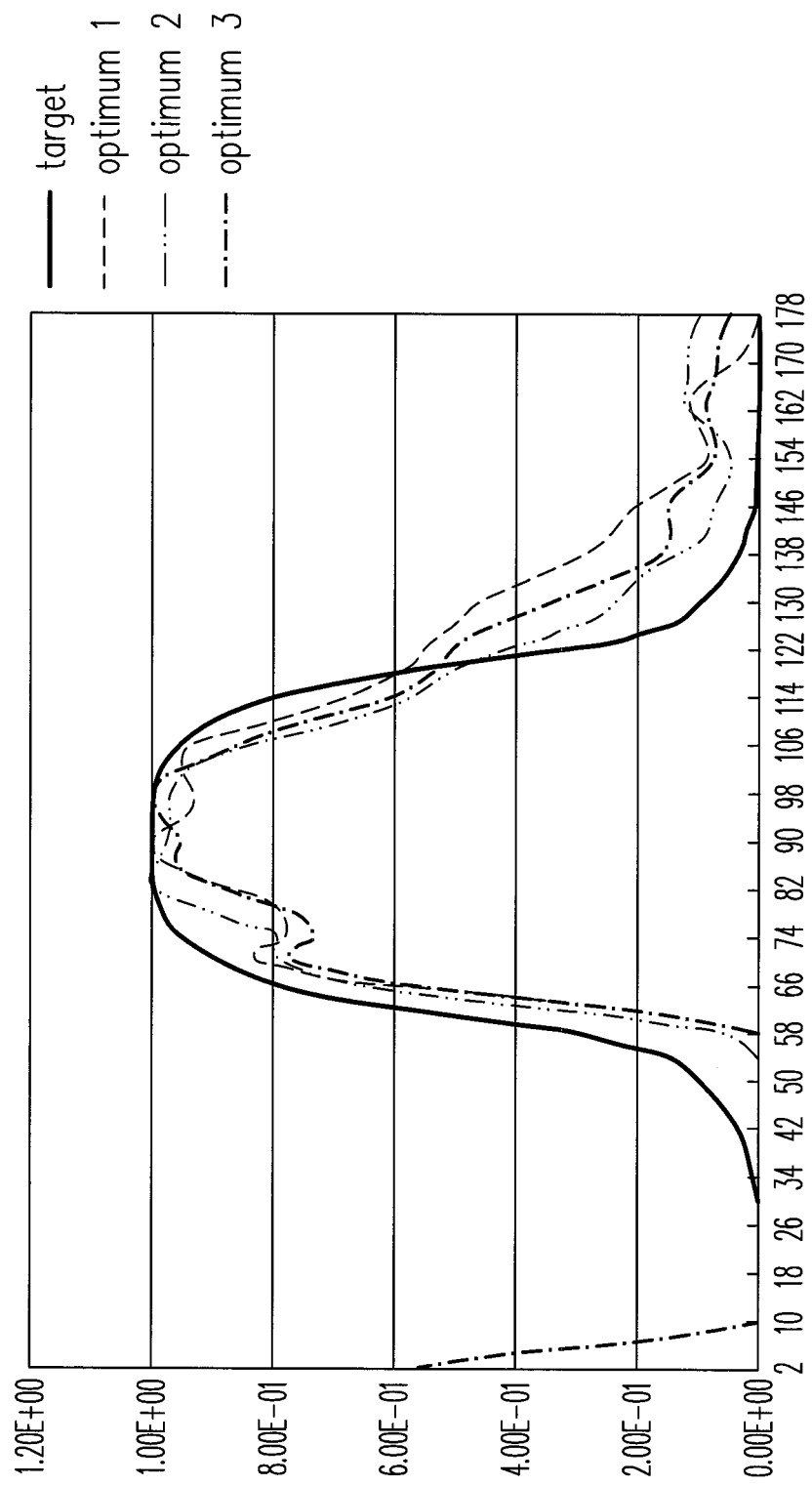
FIG. 10 is a distribution diagram of a brightness generated by a light guide plate of FIG. 5B with different optimum average slope angles $\theta 11$, $\theta 21$, $\theta 31$, $\phi 11$, $\phi 21$, and $\phi 31$ relative to an angle of vision compared to a target brightness distribution.
Figure 11:
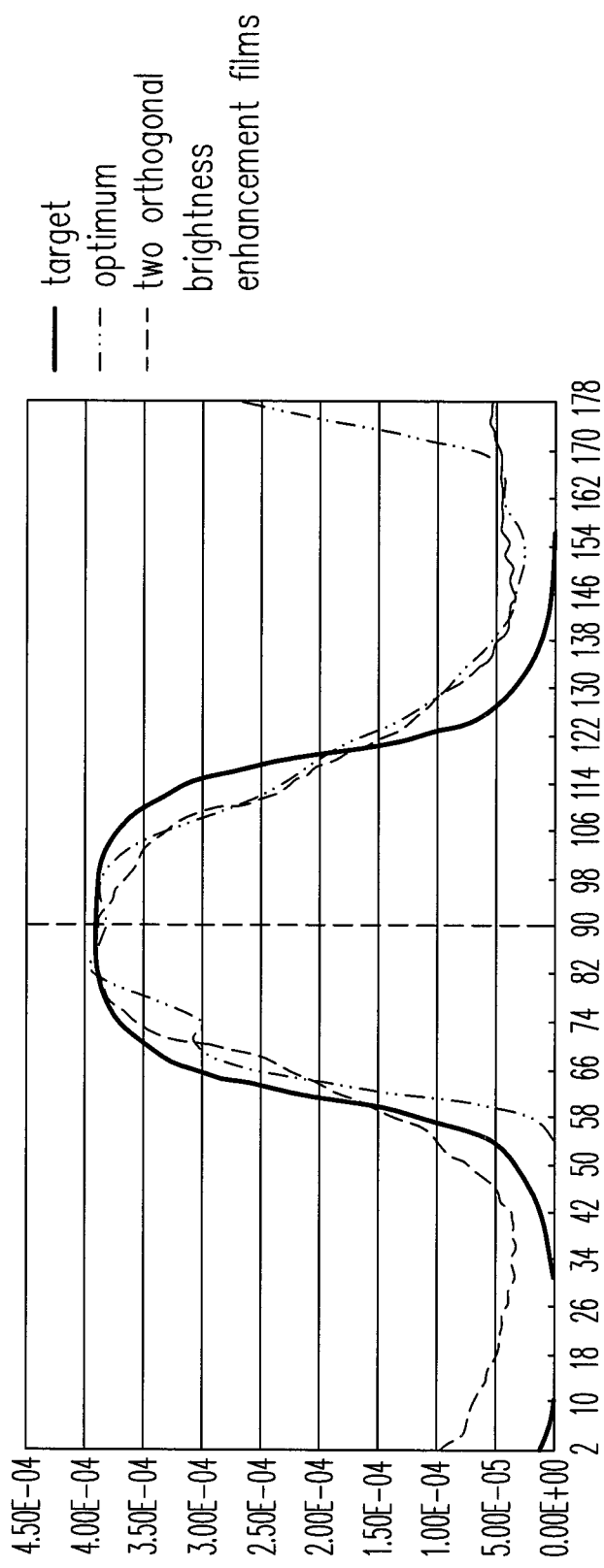
FIG. 11 is a distribution diagram of a brightness generated by a light guide plate of FIG. 5B or FIG. 6B designed under optimum parameters relative to an angle of vision compared to a target brightness distribution and the brightness distribution of a conventional light source module adopting two orthogonal brightness enhancement films.

FIG. 9 is a distribution diagram of a brightness generated by a light guide plate of FIG. 5B with different average slope angles θ11, θ21, and θ31 relative to an angle of vision. FIG. 10 is a distribution diagram of a brightness generated by a light guide plate of FIG. 5B with different optimum average slope angles θ11, θ21, θ31, φ11, φ21, and φ31 relative to an angle of vision compared to a target brightness distribution. FIG. 11 is a distribution diagram of a brightness generated by a light guide plate of FIG. 5B or FIG. 6B designed under optimum parameters relative to an angle of vision compared to a target brightness distribution and the brightness distribution of a conventional light source module adopting two orthogonal brightness enhancement films. The three values beside the dashed lines and solid line of FIG. 9 respectively represent the values of θ11, θ21, and θ31, with the unit in degrees. FIG. 10 shows a design with three optimum parameters (optimum 1, optimum 2, and optimum 3). As seen in FIG. 10, the three optimum designs are close to the target brightness distribution. As seen in FIG. 11, a brightness distribution achieved by the light guide plate of FIG. 5B or FIG. 6B with the optimum design is closer to the target brightness distribution than a brightness distribution of a light source module adopting two orthogonal brightness enhancement films. Moreover, the optimum design of the light guide plate of FIG. 5B or FIG. 6B could effectively reduce a stray light from a wide angle.

Figure 12:
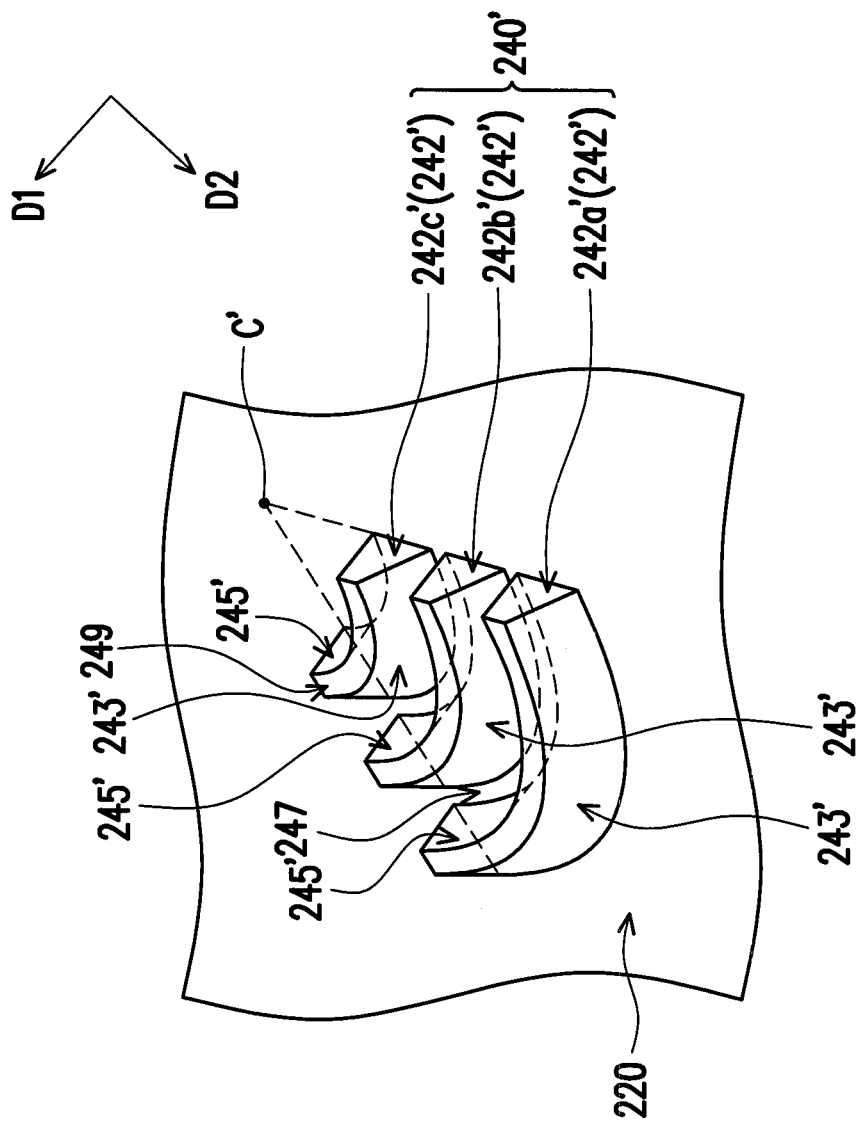
FIG. 12 is an enlarged partial view of a second surface of a light source module according to another embodiment of the invention.

FIG. 12 is an enlarged partial view of a second surface of a light source module according to another embodiment of the invention. Referring to FIG. 1A, FIG. 1C, and FIG. 12, the light source module of the embodiment is similar to the light source module of FIG. 1A, and the difference between the two light source modules is described as follows. In the light source module of the embodiment, a curved back-to-light surface 245' of each of the curved grooves 242' (for example the curved grooves 242a', 242b', and 242c') of a groove set 240' is located between the curved inclined reflective surface 243' of the curved grooves 242' and a curvature center C' of the curved grooves 242'. The curving direction of the curved inclined reflective surface 243' could achieve the effect of expanding the light beam 112.

Figure 13:
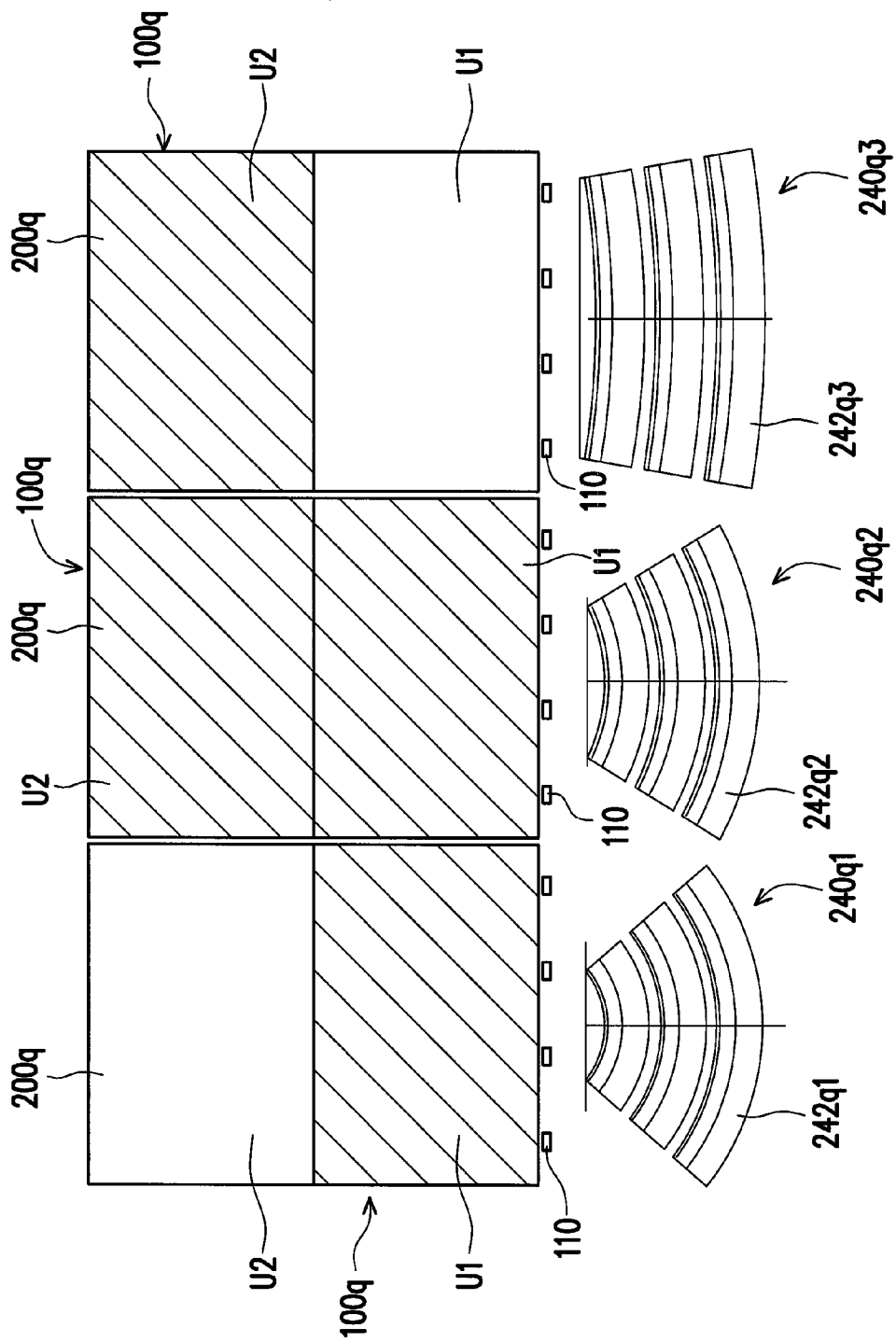
FIG. 13A, FIG. 13B, and FIG. 13C are schematic views of the main distribution range of groove sets with three different curvature radii of a light source module according to another embodiment of the invention.

FIG. 13A, FIG. 13B, and FIG. 13C are schematic views of the main distribution range of groove sets with three different curvature radii of a light source module according to another embodiment of the invention. Referring to FIG. 13A, FIG. 13B, and FIG. 13C, a light source module 100q of the embodiment is similar to the light source module 100 of FIG. 1A, and the difference between the two light source modules is described as follows. In a light guide plate 200q of the light source module 100q of the embodiment, the curved grooves 242q1, 242q2, and 242q3 of the groove sets 240q1, 240q2, and 240q3 have a plurality of different curvature radii (FIG. 13A to FIG. 13C, for example, show three different types of curvature radii). A number density on the end of the light guide plate 200q away from the light emitting device 110 is greater than a number density on the end of the light guide plate 200q close to the light emitting device 110 for the groove sets 240q3 with the largest curvature radius, and a number density on the end of the light guide plate 200q away from the light emitting device 110 is smaller than a number density on the end of the light guide plate 200$q$ close to the light emitting device 110 for the groove sets 240$q$1 with the smallest curvature radius. For example, the grooves sets 240$q$1 with the smallest curvature radius are mainly distributed in a region U1 (the slanted lines cover the main distributed area) close to the light emitting device 110 of the light guide plate 200$q$. The groove sets 240$q$2 having the middle curvature radius are mainly distributed entirely on the light guide plate 200$q$, including the region U1 and a region U2. The groove sets 240$q$3 with the largest curvature radii are mainly distributed in the region U2 far from the light emitting device 110 of the light guide plate 200$q$. However, the invention is not limited to the aforementioned distribution method. In other embodiments, the groove sets with different curvature radii could be have different distribution designs, depending on requirements of the user.

Figure 14:
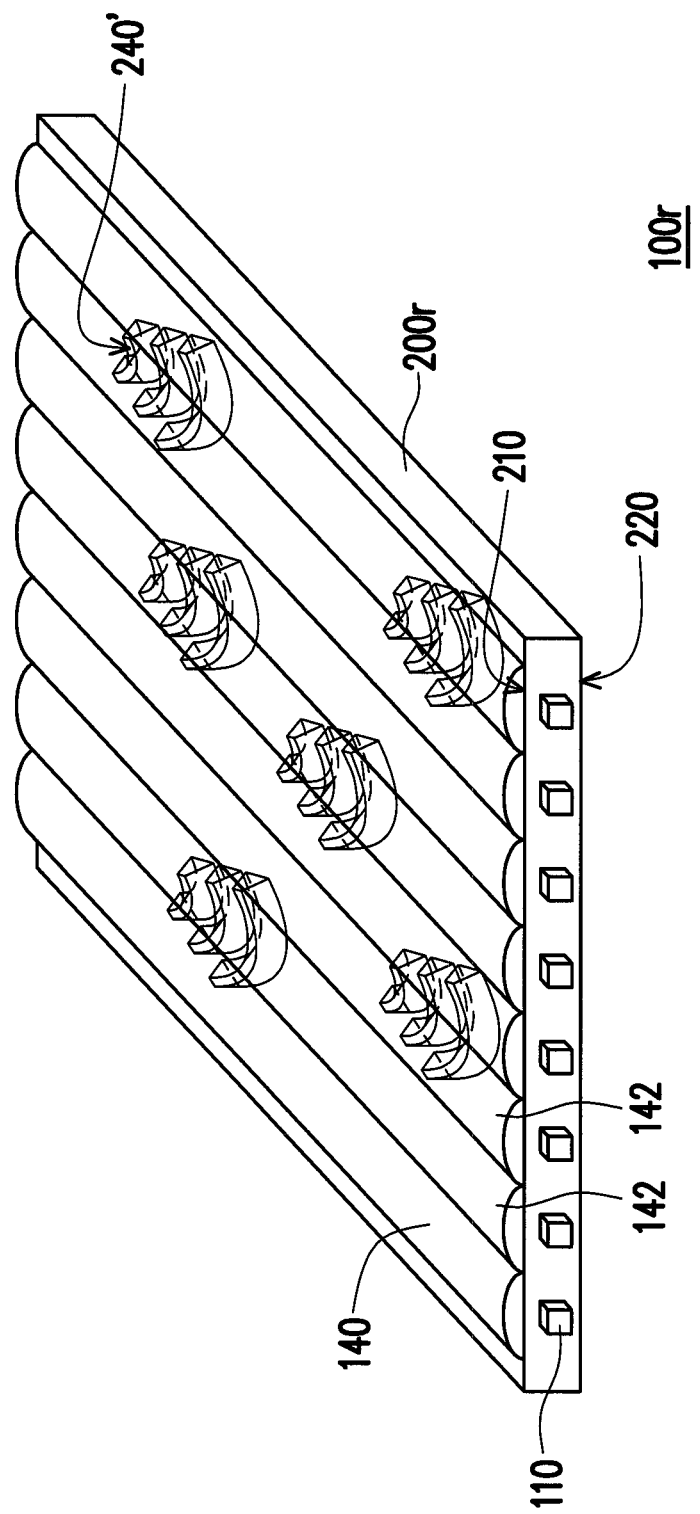
FIG. 14 is a schematic three-dimensional view of a light source module according to still another embodiment of the invention.

FIG. 14 is a schematic three-dimensional view of a light source module according to still another embodiment of the invention. The light source module 100$r$ of the embodiment is similar to the light source module of the embodiment of FIG. 12, wherein a light guide plate 200$r$ is the same as the light guide plate of the embodiment of FIG. 12. The difference therebetween is described as follows. The light source module 100$r$ of the embodiment further includes a lenticular film 140 disposed on the first surface 210 of the light guide plate 200$r$. In the embodiment, the lenticular film 140 includes a plurality of lenticular lenses 142. Each lenticular lens 142 extends from an end close to the light emitting device 110 to an end far from the light emitting device 110, and an arrangement direction of the lenticular lenses 142 are substantially parallel to the arrangement direction of the light emitting devices 110, wherein each lenticular lens 142 extends in a direction substantially perpendicular to the arrangement direction of the lenticular lenses 142. The lenticular film 140 could further assist in the brightness uniformity of the light source module 100$r$. In another embodiment, the lenticular film 140 could be replaced with a lens array (such as a two dimensional array) film.

Figure 15A:
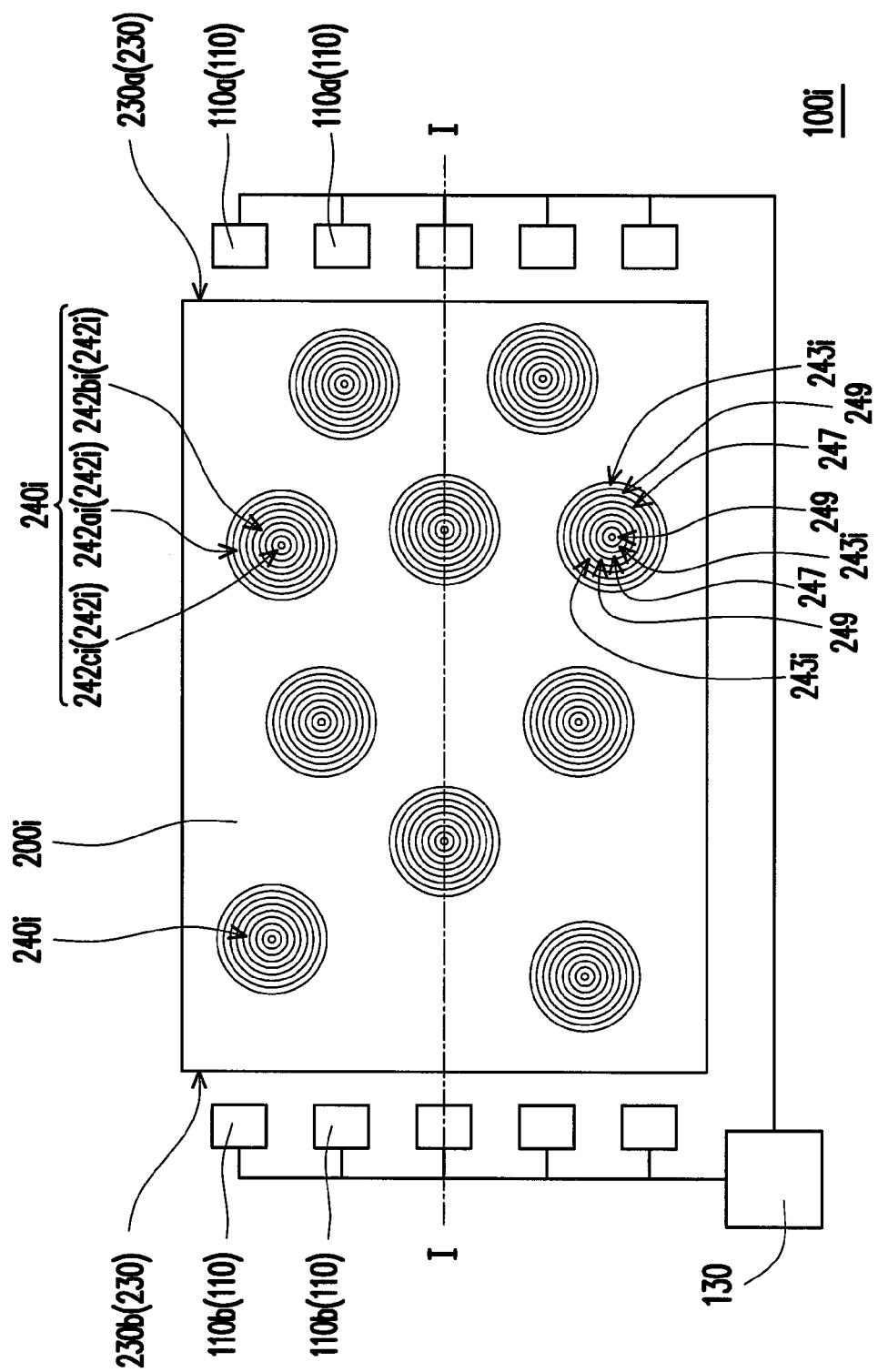
FIG. 15A is a schematic top view of a light source module according to another embodiment of the invention.
Figure 15B:
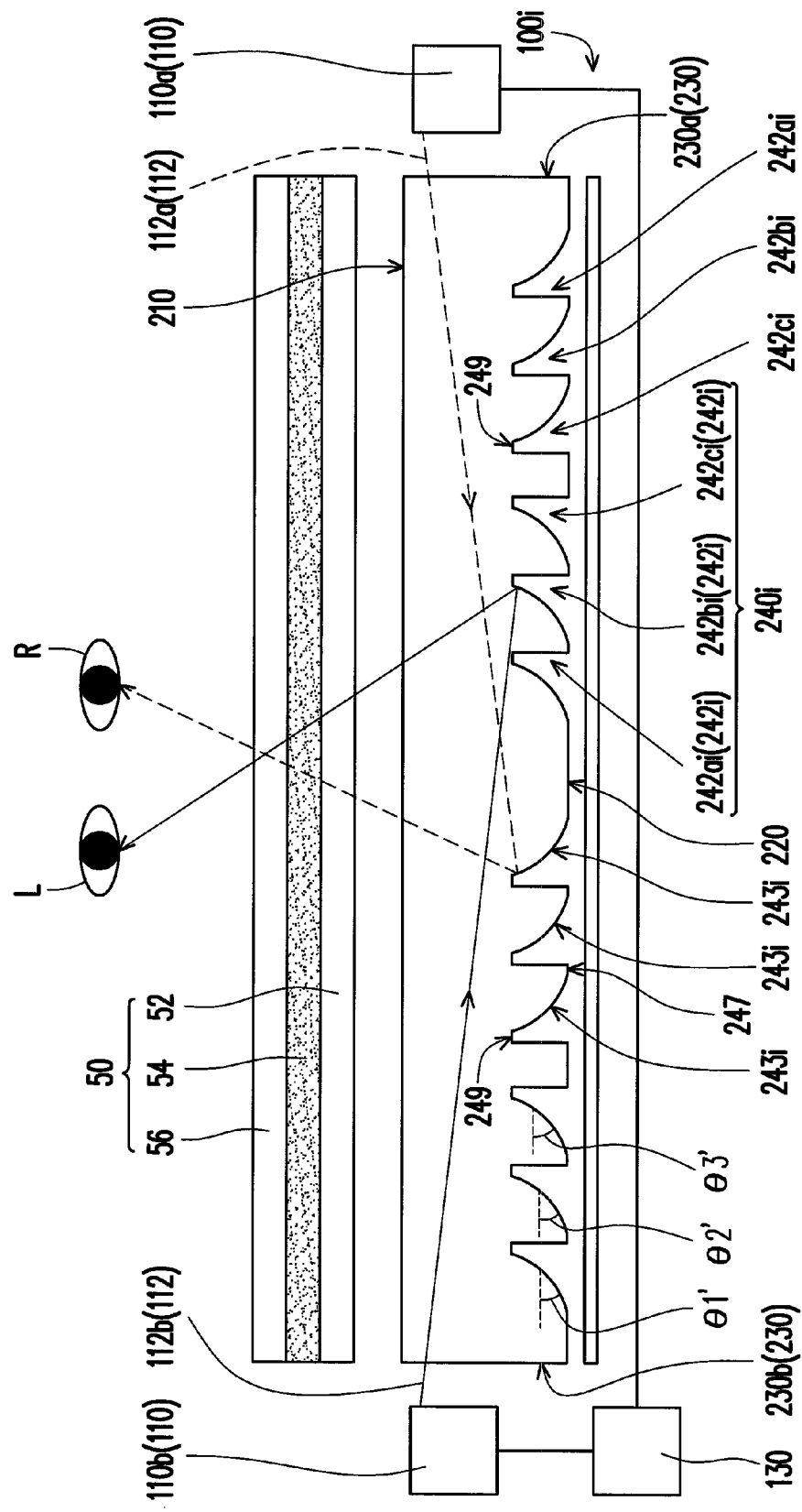
FIG. 15B is a schematic cross-sectional view along line I-I of a light source module of FIG. 15A and a liquid crystal display panel disposed on the light source module.

FIG. 15A is a schematic top view of a light source module according to another embodiment of the invention. FIG. 15B is a schematic cross-sectional view along line I-I of a light source module of FIG. 15A and a liquid crystal display panel disposed on the light source module. Referring to FIG. 15A and FIG. 15B, a light source module 100$i$ of the embodiment is similar to the light source module 100 of FIG. 1A, and the difference between the two light source modules is described as follows. In the light source module 100$i$ of the embodiment, each curved groove 242$i$ (for example, the curved grooves 242$ai$, 242$bi$, and 242$ci$) of each groove set 240$i$ is an annular groove. The curved groove 242$i$ formed as an annular shape is formed as the arc-shaped curved groove 242' of FIG. 12 extended to form a circular shape. In the embodiment, the light guide plate 200$i$ has two light incident surfaces 230 (for example, the light incident surfaces 230$a$ and 230$b$) opposite to each other, and the light emitting devices 110 could be divided to light emitting devices 110$a$ and 110$b$. The light emitting devices 110$a$ and the light emitting devices 110$b$ are respectively disposed beside the two light incident surfaces 230$a$ and 230$b$. In the embodiment, the light source module 100$i$ further includes a control unit 130 electrically connected to the light emitting devices 110$a$ and 100$b$, to drive the light emitting devices 110$a$ and 100$b$ to flash alternately. In other words, when the light emitting device 110$a$ emits a light beam 112$a$, the light emitting device 110$b$ does not emit a light beam 112$b$. Moreover, when the light emitting device 110$b$ emits the light beam 112$b$, the light emitting device 110$a$ does not emit the light beam 112$a$.

In the embodiment, the average slope angle of each curved inclined reflective surface 243$i$ is greater than or equal to 40 degrees and smaller than 60 degrees. For example, the average slope angles θ1', θ2', and θ3' of the curved inclined reflective surface 243$i$ of the curved grooves 242$ai$, 242$bi$, and 242$ci$ could be equal, partially equal, or not equal. A liquid crystal panel 50 could be disposed on the light source module 100$i$ of the embodiment to form a three-dimensional display. In the embodiment, the liquid crystal panel 50 includes a active device array substrate 52, a liquid crystal layer 54, and an opposite substrate 56 sequentially arranged from bottom to top, wherein the active device array substrate 52 is, for example, a thin film transistor array substrate, and the opposite substrate 56 is, for example, a color filter array substrate. The design of the average slope angles θ1', θ2', and θ3' could cause the light beam 112$b$ emitted by the light emitting device 110$b$ to be reflected by the curved inclined reflective surface 243$i$ to the top left portion of FIG. 15B, and after carrying an image of the liquid crystal panel 50, the light beam 112$b$ could be transmitted to the left eye L of the user. The design of the average slope angles θ1', θ2', and θ3' could also cause the light beam 112$a$ emitted by the light emitting device 110$a$ to be reflected by the curved inclined reflective surface 243$i$ to the top right portion of FIG. 15B, and after carrying an image of the liquid crystal panel 50, the light beam 112$a$ could be transmitted to the right eye R of the user. By alternately allowing the light beam 112$a$ and the 112$b$ to respectively carry the left eye image and the right eye image, the brain of the user forms a three-dimensional image.

Figure 16:
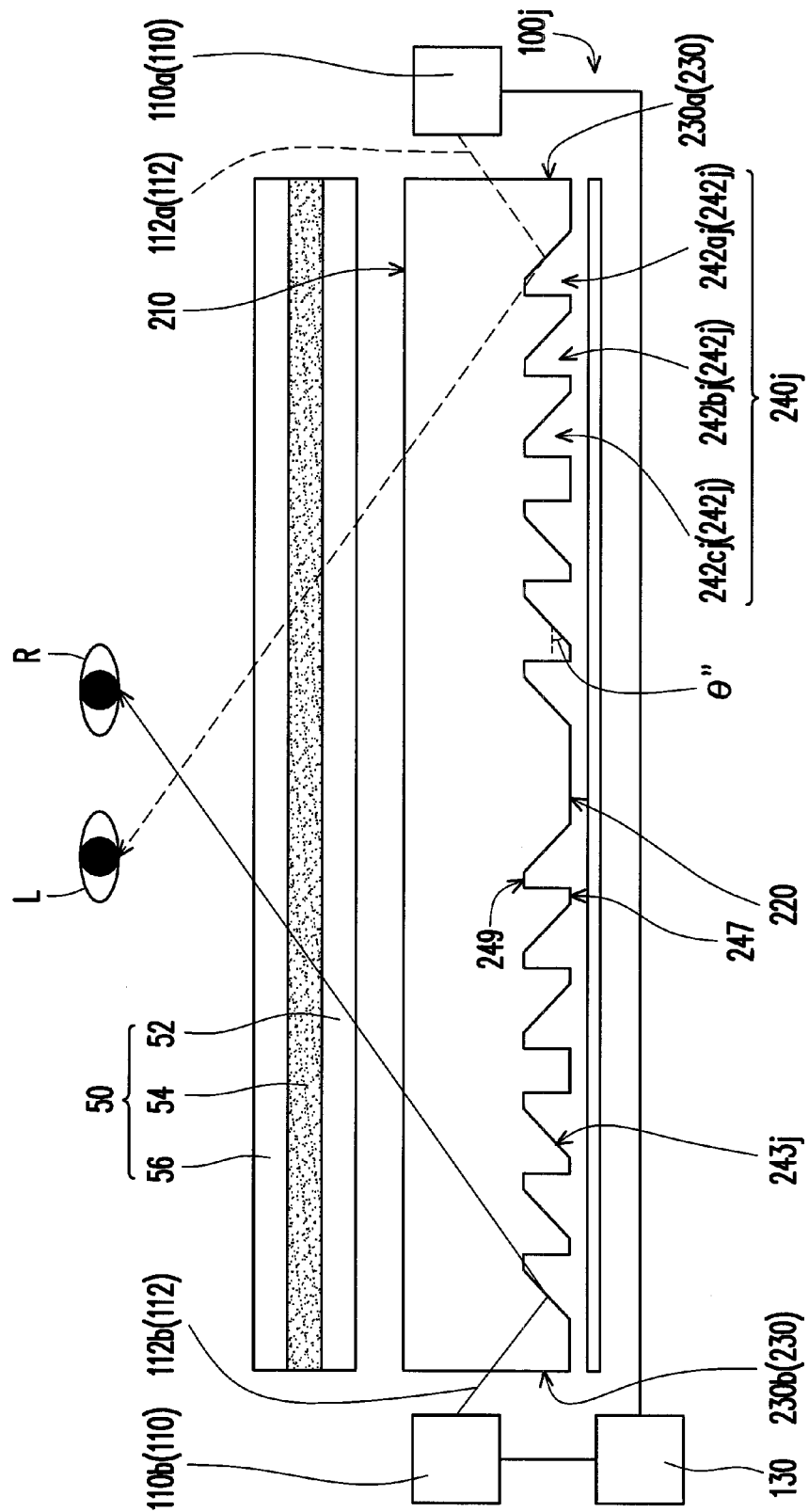
FIG. 16 is a schematic cross-sectional view of a light source module and a liquid crystal display panel disposed on the light source module according to yet another embodiment of the invention.

FIG. 16 is a schematic cross-sectional view of a light source module 100$j$ and a liquid crystal display panel 50 disposed on the light source module 100$j$ according to yet another embodiment of the invention. Referring to FIG. 16, the light source module 100$j$ of the embodiment is similar to the light source module 100$i$ of FIG. 15B, and the difference is in the design of the average slope angle of the curved inclined reflective surfaces of the two embodiments. In the light source module 100$j$ of the embodiment, an average slope angle θ" of the curved inclined reflective surface 243$j$ of each curved groove 242$j$ (for example the curved grooves 242$aj$, 242$bj$, and 242$cj$) of each groove set 240$j$ is greater than or equal to 30 degrees and less than or equal to 50 degrees. The design of the average slope angle θ" could cause the light beam 112$b$ emitted by the light emitting device 110$b$ to be reflected by the curved inclined reflective surface 243$j$ to the top right portion of FIG. 16, and after carrying an image of the liquid crystal panel 50, the light beam 112$b$ could be transmitted to the right eye R of the user. The design of the average slope angle θ" could also cause the light beam 112$a$ emitted by the light emitting device 110$a$ to be reflected by the curved inclined reflective surface 243$j$ to the top left portion of FIG. 16, and after carrying an image of the liquid crystal panel 50, the light beam 112$a$ could be transmitted to the left eye L of the user. By alternately allowing the light beam 112$a$ and the 112$b$ to respectively carry the left eye image and the right eye image, the brain of the user forms a three-dimensional image. In the embodiment, the cross-section line of the curved inclined reflective surface 243$j$ formed in a direction perpendicular to the first surface 210 is a straight line. However, in other embodiments, the cross-section line could be a curved line.

Figure 17:
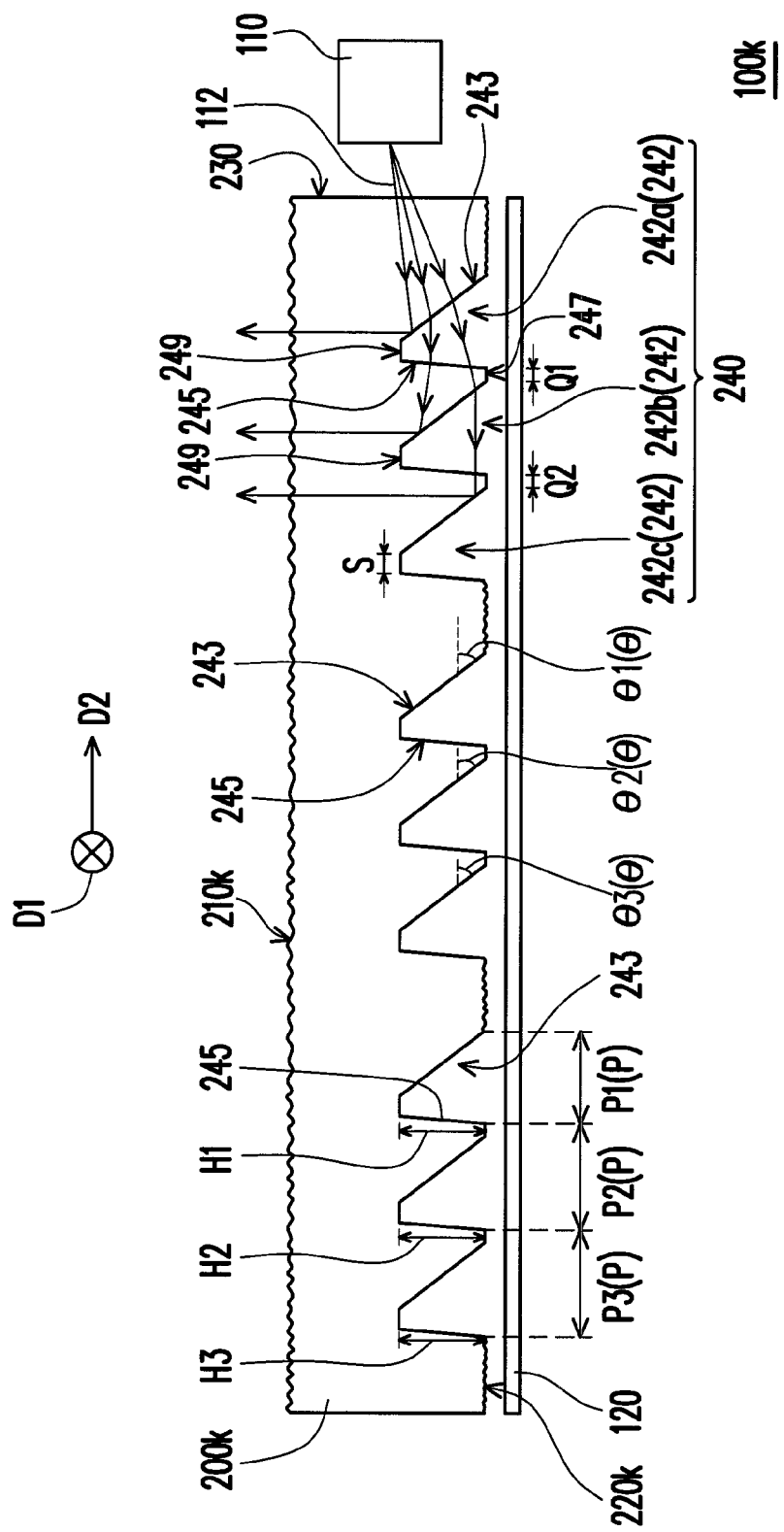
FIG. 17 is a schematic cross-sectional view of a light source module according to yet another embodiment of the invention.

FIG. 17 is a schematic cross-sectional view of a light source module 100$k$ according to yet another embodiment of the invention. Referring to FIG. 17, the light source module 100k of the embodiment is similar to the light source module 100 of FIG. 1A, and the difference between the two light source modules is described as follows. The light guide plate 200k of the light source module 100k of the embodiment is similar to the light guide plate 200 of the FIG. 1A, wherein the difference is as follows. Both the portion of the second surface 220 excluding the groove sets 240 of the light guide plate 200 of FIG. 1A and first surface 210 are plane surfaces. However, in the embodiment, at least one of a portion of the second surface 220k excluding the groove sets 240 of the light guide plate 200k and the first surface 210k is a rough surface, such as a sandblasted surface. The rough surface could blur the independent bright spots caused by the groove set 240 or the defects of the light guide plate 200k, so that it is difficult or impossible for the user to see the independent bright spots with the naked eye. Accordingly, the brightness of the light source module 100k may be more uniform. In other embodiments, the first surface 210k could be a rough surface, and the portion of the second surface 220k excluding the groove sets 240 is a plane surface. Alternatively, the first surface 210k could be a plane surface, and the portion of the second surface 220k excluding the groove sets 240 is a rough surface.

In conclusion, the embodiments of the invention include at least one of the following advantages or functions. In the light guide plate and the light source module of the embodiment of the invention, the curved inclined reflective surface is disposed on the second surface, and could reflect the light beam in a predetermined direction. Thus, a usage quantity of an optical film on the first surface of the light guide plate could be reduced, or the optical film could be omitted, thereby reducing light loss and production cost. In addition, since the absolute value of the slope of any tangent line of any point on the connection surface relative to the first surface is less than 1.7, it is easier to remove a mold from the light guide plate after the light guide plate is formed, further raising a transfer ratio of the groove sets. Furthermore, in the light guide plate of the embodiment of the invention, since the groove sets of the light guide plate are formed by a mold, and since the mold has a connection surface, it is easier to remove a mold from the light guide plate after formation, thus raising the transfer ratio of the groove sets.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims.

What is claimed is:

1. A light guide plate, comprising:
   a first surface;
   a second surface opposite to the first surface;
   at least one light incident surface connecting the first surface and the second surface; and
   a plurality of groove sets, each groove set separately disposed from the other groove set on the second surface, wherein each of the groove sets comprises a plurality of curved grooves, each of the curved grooves has a curved inclined reflective surface, a curved back-to-light surface, and a bottom surface connected to the curved inclined reflective surface and the curved back-to-light surface, the curved inclined reflective surface is inclined with respect to the first surface, the curved grooves of each of the groove sets curve toward a same curving direction, the curved inclined reflective surface of one of two adjacent curved grooves is connected to the curved back-to-light surface of the other one of the two adjacent curved grooves through a connection surface, and an absolute value of a slope of any tangent line of any point on the connection surface relative to the first surface is less than 1.7,
   wherein the curved grooves of the groove sets have a plurality of different curvature radii, a number density on an end of the light guide plate away from the light incident surface is greater than a number density on an end of the light guide plate close to the light incident surface for the groove sets with a largest curvature radius, a number density on the end of the light guide plate away from the light incident surface is smaller than a number density on the end of the light guide plate close to the light incident surface for the groove sets with a smallest curvature radius, and the groove sets having a middle curvature radius are distributed entirely on the light guide plate, wherein the middle curvature radius is between the largest curvature radius and the smallest curvature radius.

2. The light guide plate as claimed in claim 1, wherein average slope angles of the curved inclined reflective surfaces of the curved grooves of each of the groove sets relative to the first surface are substantially different, and the average slope angle is defined as an average of slope angles of tangent lines, relative to the first surface, of all points on a cross-sectional line of the curved inclined reflective surface of the curved groove of the groove set made by cutting perpendicular to the first surface.

3. The light guide plate as claimed in claim 2, wherein a difference value between a greatest value and a smallest value of the average slope angles of the curved inclined reflective surfaces of the curved grooves of each of the groove sets relative to the first surface is less than or equal to 25 degrees.

4. The light guide plate as claimed in claim 1, wherein an average slope angle of each of the curved inclined reflective surfaces is greater than or equal to 20 degrees and less than or equal to 70 degrees, and the average slope angle is defined as an average of slope angles of tangent lines, relative to the first surface, of all points on a cross-sectional line of the curved inclined reflective surface of the curved groove of the groove set made by cutting perpendicular to the first surface.

5. The light guide plate as claimed in claim 1, wherein a difference value between a greatest value and a smallest value of the average slope angles of the curved back-to-light surfaces of the curved grooves of each of the groove sets relative to the first surface is less than or equal to 25 degrees, and the average slope angle is defined as an average of slope angles of tangent lines, relative to the first surface, of all points on a cross-sectional line of the curved back-to-light surface of the curved groove of the groove set made by cutting perpendicular to the first surface.

6. The light guide plate as claimed in claim 1, wherein an average slope angle of each of the curved back-to-light surfaces is greater than or equal to 60 degrees and less than or equal to 89 degrees, and the average slope angle is defined as an average of slope angles of tangent lines, relative to the first surface, of all points on a cross-sectional line of the curved back-to-light surface of the curved groove of the groove set made by cutting perpendicular to the first surface.

7. The light guide plate as claimed in claim 1, wherein the curved inclined reflective surface of each of curved grooves has a plurality of sub-curved inclined reflective surfaces with discrete slopes, the curved inclined reflective surface of each of the curved grooves has a reference angle, a difference between a slope angle of each of the sub-curved inclined reflective surfaces of each of the curved inclined reflective surfaces relative to the first surface and the corresponding reference angle is less than or equal to 10 degrees, and the reference angle of each of the curved inclined reflective surfaces is greater than or equal to 20 degrees and less than or equal to 70 degrees.

8. The light guide plate as claimed in claim 1, wherein slopes of tangent lines of each of the curved inclined reflective surfaces relative to the first surface progressively decrease from an end close to the first surface to an end close to the second surface.

9. The light guide plate as claimed in claim 1, wherein slopes of tangent lines of each of the curved inclined reflective surfaces relative to the first surface progressively increase from an end close to the first surface to an end close to the second surface.

10. The light guide plate as claimed in claim 1, wherein an absolute value of a slope of any tangent line of any point on the bottom surface relative to the first surface is less than 1.7.

11. The light guide plate as claimed in claim 1, wherein each of the curved grooves is an arc groove, and the curved inclined reflective surface of the arc groove is located between the curved back-to-light surface and the light incident surface.

12. The light guide plate as claimed in claim 1, wherein each of the curved grooves is an annular groove.

13. The light guide plate as claimed in claim 1, wherein the curved inclined reflective surface of the curved groove is located between the curved back-to-light surface of the curved groove and a curvature center of the curved groove.

14. The light guide plate as claimed in claim 1, wherein the curved back-to-light surface of the curved groove is located between the curved inclined reflective surface of the curved groove and a curvature center of the curved groove.

15. The light guide plate as claimed in claim 1, wherein at least one of a portion of the second surface excluding the groove sets and the first surface is a rough surface.

16. The light guide plate as claimed in claim 1, wherein a ratio of a width of the connection surface along a radial direction from a curvature center of each of the curved grooves relative to an average value of a width of two adjacent curved grooves is greater than or equal to 0.1 and less than or equal to 0.5.

17. The light guide plate as claimed in claim 1, wherein a ratio of a width of the bottom surface along a radial direction from a curvature center of each of the curved grooves relative to a width of the same curved groove is greater than or equal to 0.1 and less than or equal to 0.8.

18. A light source module, comprising:
  a light guide plate, comprising:
    a first surface;
    a second surface opposite to the first surface;
    at least one light incident surface connecting the first surface and the second surface;
    a plurality of groove sets, each groove set separately disposed from the other groove set on the second surface, wherein each of the groove sets comprises a plurality of curved grooves, each of the curved grooves has a curved inclined reflective surface, a curved back-to-light surface, and a bottom surface connected to the curved inclined reflective surface and the curved back-to-light surface, the curved inclined reflective surface is inclined with respect to the first surface, the curved grooves of each of the groove sets curve toward a same curving direction, the curved inclined reflective surface of one of two adjacent curved grooves is connected to the curved back-to-light surface of the other one of the two adjacent curved grooves through a connection surface, and an absolute value of a slope of any tangent line of any point on the connection surface relative to the first surface is less than 1.7; and
  at least one light emitting device disposed beside the light incident surface and capable of emitting a light beam, wherein the light beam is capable of entering the light guide plate through the light incident surface and is capable of being transmitted outside the light guide plate through the first surface, and the curved inclined reflective surface is capable of reflecting the light beam from the light incident surface to the first surface;
  wherein the curved grooves of the groove sets have a plurality of different curvature radii, a number density on an end of the light guide plate away from the light emitting device is greater than a number density on an end of the light guide plate close to the light emitting device for the groove sets with a largest curvature radius, a number density on the end of the light guide plate away from the light emitting device is smaller than a number density on the end of the light guide plate close to the light emitting device for the groove sets with a smallest curvature radius, and the groove sets having a middle curvature radius are distributed entirely on the light guide plate, wherein the middle curvature radius is between the largest curvature radius and the smallest curvature radius.

19. The light source module as claimed in claim 18, wherein average slope angles of the curved inclined reflective surfaces of the curved grooves of each of the groove sets relative to the first surface are substantially different, and the average slope angle is defined as an average of slope angles of tangent lines, relative to the first surface, of all points on a cross-sectional line of the curved inclined reflective surface of the curved groove of the groove set made by cutting perpendicular to the first surface.

20. The light source module as claimed in claim 19, wherein a difference value between a greatest value and a smallest value of the average slope angles of the curved inclined reflective surfaces of the curved grooves of each of the groove sets relative to the first surface is less than or equal to 25 degrees.

21. The light source module as claimed in claim 18, wherein an average slope angle of each of the curved inclined reflective surfaces is greater than or equal to 20 degrees and less than or equal to 70 degrees, and the average slope angle is defined as an average of slope angles of tangent lines, relative to the first surface, of all points on a cross-sectional line of the curved inclined reflective surface of the curved groove of the groove set made by cutting perpendicular to the first surface.

22. The light source module as claimed in claim 18, wherein a difference value between a greatest value and a smallest value of the average slope angles of the curved back-to-light surfaces of the curved grooves of each of the groove sets relative to the first surface is less than or equal to 25 degrees, and the average slope angle is defined as an average of slope angles of tangent lines, relative to the first surface, of all points on a cross-sectional line of the curved back-to-light surface of the curved groove of the groove set made by cutting perpendicular to the first surface.

23. The light source module as claimed in claim 18, wherein an average slope angle of each of the curved back-to-light surfaces is greater than or equal to 60 degrees and less than or equal to 89 degrees, and the average slope angle is defined as an average of slope angles of tangent lines, relative to the first surface, of all points on a cross-sectional line of the curved back-to-light surface of the curved groove of the groove set made by cutting perpendicular to the first surface.

24. The light source module as claimed in claim 18, wherein the curved inclined reflective surface of each of the curved grooves has a plurality of sub-curved inclined reflective surfaces with discrete slopes, the curved inclined reflective surface of each of the curved grooves has a reference angle, a difference between a slope angle of each of the sub-curved inclined reflective surfaces of each of the curved inclined reflective surfaces relative to the first surface and the corresponding reference angle is less than or equal to 10 degrees, and the reference angle of each of the curved inclined reflective surfaces is greater than or equal to 20 degrees and less than or equal to 70 degrees.

25. The light source module as claimed in claim 18, wherein slopes of tangent lines of each of the curved inclined reflective surfaces relative to the first surface progressively decrease from an end close to the first surface to an end close to the second surface.

26. The light source module as claimed in claim 18, wherein slopes of tangent lines of each of the curved inclined reflective surfaces relative to the first surface progressively increase from an end close to the first surface to an end close to the second surface.

27. The light source module as claimed in claim 18, wherein an absolute value of a slope of any tangent line of any point on the bottom surface relative to the first surface is less than 1.7.

28. The light source module as claimed in claim 18, wherein each of the curved grooves is an arc groove, and the curved inclined reflective surface of the arc groove is located between the curved back-to-light surface and the light incident surface.

29. The light source module as claimed in claim 18, wherein each of the curved grooves is an annular groove.

30. The light source module as claimed in claim 29, wherein the at least one light incident surface is two opposite light incident surfaces, and the at least one light emitting device is two light emitting devices respectively disposed beside the two light incident surfaces, and the light source module further comprises a control unit electrically connected to the two light emitting devices for driving the two light emitting devices to flash alternately.

31. The light source module as claimed in claim 18, wherein the curved inclined reflective surface of the curved groove is located between the curved back-to-light surface of the curved groove and a curvature center of the curved groove.

32. The light source module as claimed in claim 18, wherein the curved back-to-light surface of the curved groove is located between the curved inclined reflective surface of the curved groove and a curvature center of the curved groove.

33. The light source module as claimed in claim 18, further comprising a reflecting unit disposed on the second surface.

34. The light source module as claimed in claim 18, wherein at least one of a portion of the second surface excluding the groove sets and the first surface is a rough surface.

* * * * *